(12) United States Patent
Baren et al.

(10) Patent No.: US 10,699,258 B2
(45) Date of Patent: Jun. 30, 2020

(54) PASSENGER AUTHENTICATION FOR IN-VEHICLE VENDING

(71) Applicant: Lyft, Inc., San Francisco, CA (US)

(72) Inventors: Trent Baren, San Francisco, CA (US); Luke George Greenwood, San Francisco, CA (US); Sachin Agarwal, San Francisco, CA (US); David Harry Garcia, Campbell, CA (US); Ethan Duncan Eyler, San Francisco, CA (US); Tzu-San Hung, San Francisco, CA (US); Martin Conte MacDonnell, San Francisco, CA (US)

(73) Assignee: Lyft Inc., San Francisco, CA (US)

( * ) Notice: Subject to any disclaimer, the term of this patent is extended or adjusted under 35 U.S.C. 154(b) by 217 days.

(21) Appl. No.: 15/859,626

(22) Filed: Dec. 31, 2017

(65) Prior Publication Data

US 2019/0205854 A1  Jul. 4, 2019

(51) Int. Cl.
*G06Q 20/18* (2012.01)
*G06Q 20/04* (2012.01)
*G07C 9/00* (2020.01)
*G06Q 10/08* (2012.01)
*G06Q 20/12* (2012.01)

(52) U.S. Cl.
CPC ........... *G06Q 20/18* (2013.01); *G06Q 10/087* (2013.01); *G06Q 20/0453* (2013.01); *G07C 9/00182* (2013.01)

(58) Field of Classification Search
USPC .......................................................... 705/16
See application file for complete search history.

(56) References Cited

U.S. PATENT DOCUMENTS 8,612,294 B1 * 12/2013 Treyz .................... G06Q 20/12
  705/14.62
2016/0009211 A1 * 1/2016 Dao .................... G07F 17/0071
  221/133

* cited by examiner

*Primary Examiner* — Garcia Ade
(74) *Attorney, Agent, or Firm* — Baker Botts L.L.P.

(57) ABSTRACT

In one embodiment, a method includes receiving a request from a user computing device associated with a user for one or more items from an in-vehicle vending apparatus during a ride. The method also includes sending information associated with the user to start a vending session using the in-vehicle vending apparatus. The method also includes receiving an indication that the user associated with the user computer device accessed the in-vehicle vending apparatus. The method also includes determining that the user associated with the user computing device is the only user associated with the ride, determining that the user associated with the user computing device is one of a plurality of users associated with the ride, or determining that the user associated with the user computing device is associated with the in-vehicle vending apparatus.

20 Claims, 16 Drawing Sheets

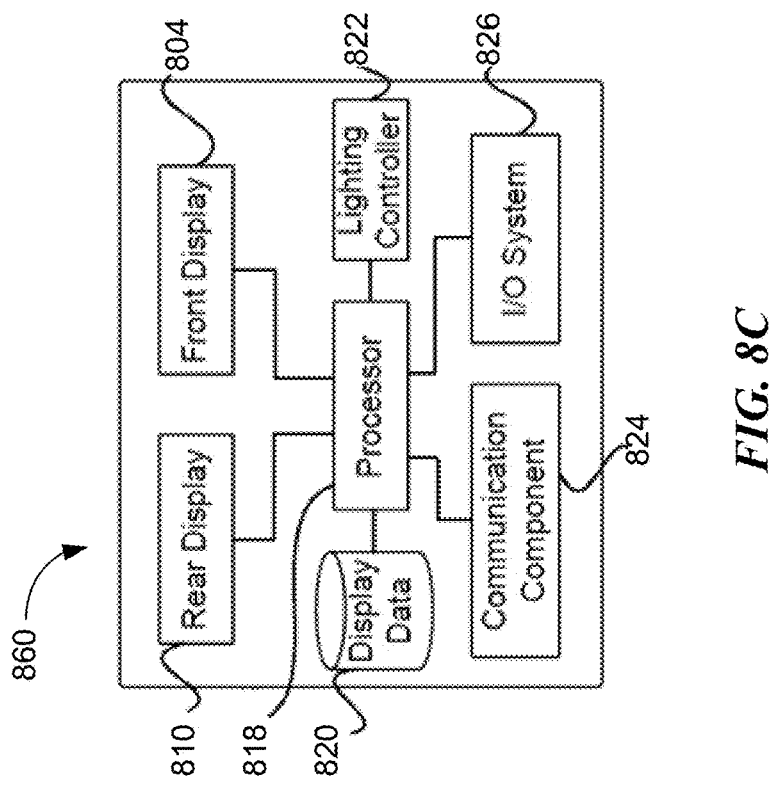
FIG. 8C
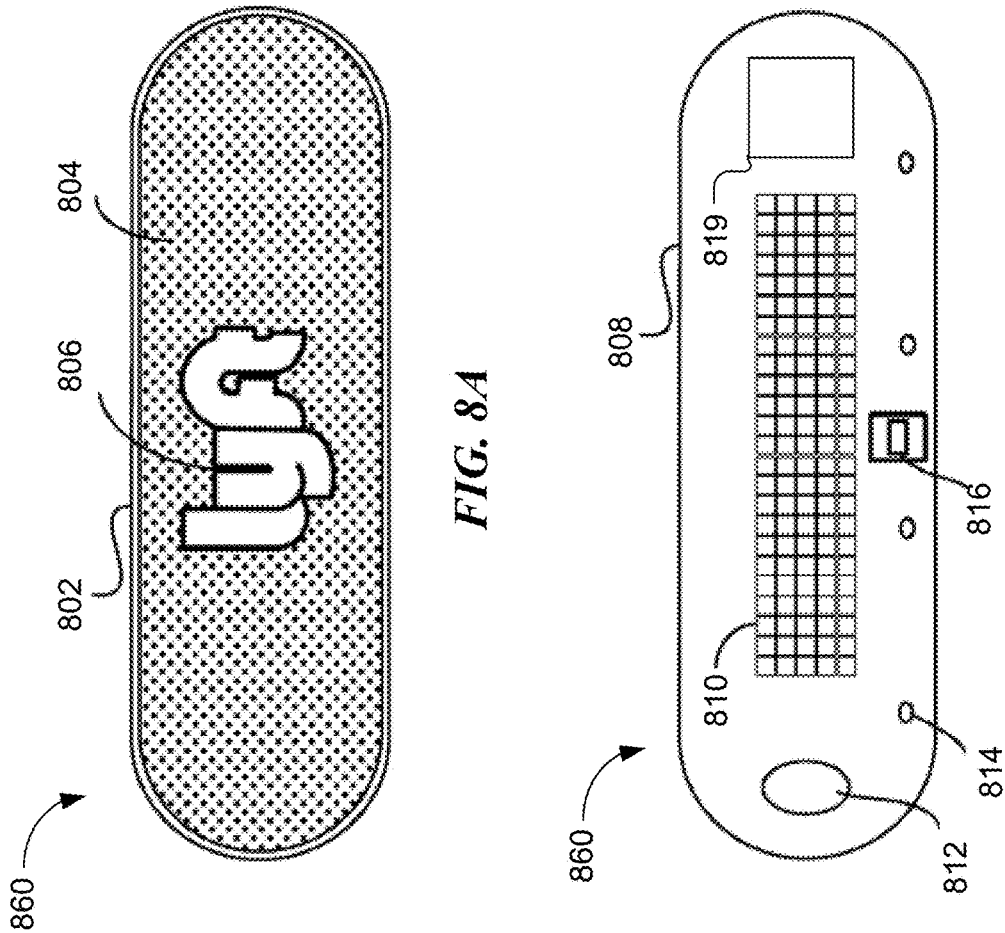
FIG. 8A
FIG. 8B

PASSENGER AUTHENTICATION FOR IN-VEHICLE VENDING

BACKGROUND

Transportation and related services by trains and airplanes typically provide various amenities free of charge or for sale to their users. These amenities, including food, blankets, ear buds, and other useful items, provide many benefits to travelers by making their trip more comfortable and enjoyable. However, other transportation services such as ride services, which have substantially increased in popularity and convenience over the last couple of years, usually do not provide as many amenities to their users during their ride. Because the driver of the ride service must focus on driving, they are unlikely to have the time or resources to also sell amenities to the users during the ride, even though various amenities may be very useful or popular to the users (e.g., energy bars during longer trips, energy drinks during a late-night trip, etc.). Unfortunately, this may decrease overall user experience and satisfaction with the ride services and drivers.

BRIEF DESCRIPTION OF THE DRAWINGS

FIGS. 8A-8C illustrate an example of a transportation management vehicle device.

DESCRIPTION OF EXAMPLE EMBODIMENTS

Transportation services like taxis and ride-sharing applications typically involve a driver providing transportation to one or more users. Users generally communicate freely with their drivers, providing drivers information about which roads to take, where to stop for drop-off, or to provide correction if the driver is going in the wrong direction. In addition, drivers may provide water, gum, or other small amenities for the users to enhance their overall experience. Because these items are typically provided to the users free of charge, the users can request them or simply take them from a compartment in the car without diverting the driver's attention for more than a brief period of time.

Figure 1:
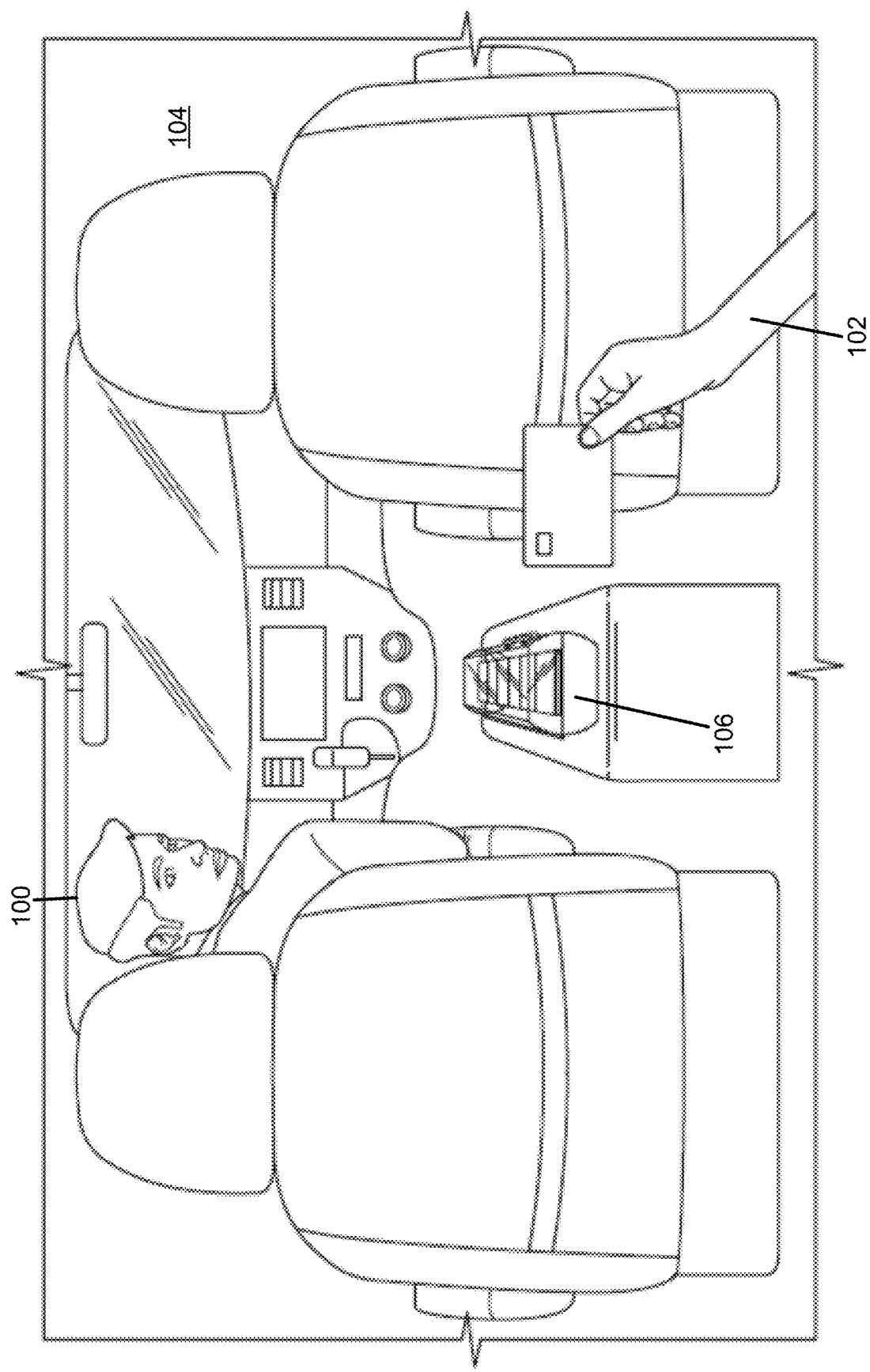
FIG. 1 illustrates an example of problems with current methods for providing amenities to users.

Various problems may arise when the driver wants to provide a wider selection of food and other items for the user, including various items for purchase in addition to the items that are free of charge. FIG. 1 illustrates an example of problems with current methods for providing amenities to user. As shown in FIG. 1, driver 100 and user 102 are sitting in vehicle 104, and driver 100 is turned around to face user 102 to discuss various items that are available for purchase or free of charge in vending box 106. During this exchange, user 102 may ask the driver questions about the various items, including how much the items cost, which items are free, how to pay for items, etc. After deciding on which items to purchase, user 102 may then pay driver 100, either with credit card, which would require driver 100 to process the card transaction, or with cash, which would require driver 100 to confirm the correct amount and provide user 102 with any change. However, driver 100 must focus on driving during the ride, and the degree of attention and interaction that would be required of driver 100 in order to facilitate the purchase of items would render the ride dangerous for both driver 100 and user 102. Moreover, anything less than good customer service would undermine user experience and dissuade user 102 from purchasing any items, which in turn would result in less drivers providing these amenities.

Figure 2:
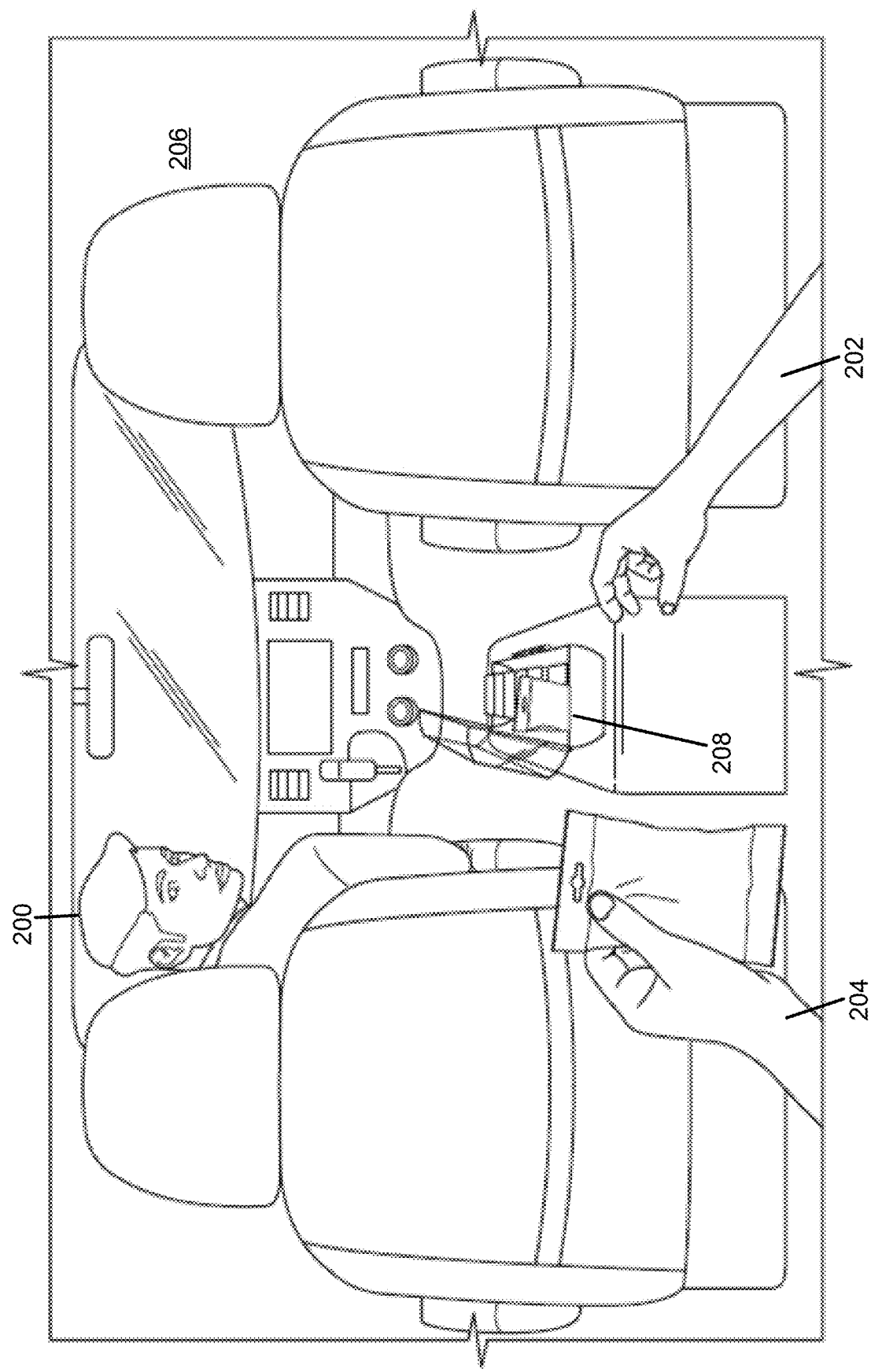
FIG. 2 illustrates an example of problems with inventory tracking for current methods of providing amenities to users.

Since a ride often includes more than one user, and each user may be associated with one or more passengers, another problem that may arise is the difficulty for drivers or a vending system to determine and keep track of which user purchased which items. FIG. 2 illustrates an example of problems with inventory tracking for current methods of providing amenities to users. As shown in FIG. 2, driver 200 and users 202 and 204 are sitting in vehicle 206. Users 202 and 204 may both be interested in purchasing items from vending box 208, and thus may both interact with driver 200 to request information and pay for items. However, similar to the example illustrated in FIG. 1, these interactions may take the driver's attention from driving and present additional problems with determining which user took which items in order to complete the purchases. In addition, the situation where no drivers are present (e.g., the situation of an autonomous vehicle) may present additional problems for managing the vending process. As an example, in this situation, there may be one or more users associated with a ride and the vending system (or the vending apparatus) may need to identify and authenticate which user is accessing the vending apparatus and track which items are taken without the driver being present in the vehicle.

To overcome these problems, a "smart" in-vehicle vending apparatus may be provided during a ride (e.g., a ride session) that can facilitate the purchase of items without any input from the driver. The in-vehicle vending apparatus may interface with a transportation management system to streamline the accessing and purchasing of items displayed in the in-vehicle vending apparatus. For example, the in-vehicle vending apparatus may retrieve user information from the transportation management system to authenticate the user and link the purchase to a ride, allow the user to select one or more items to purchase, and then confirm the items purchased after the user is finished and send the user an itemized receipt for the purchase. When two or more users are present in the ride, the in-vehicle vending apparatus may determine which user is making the purchase (e.g., by requiring the user to identify himself/herself) in order to bill the correct user for the purchase. In addition, when a user not linked to a ride associated with the in-vehicle vending apparatus (e.g., when the user is using a ride service of a different company not associated with the in-vehicle vending apparatus) but nonetheless would like to make a purchase from the in-vehicle vending apparatus, the vending apparatus may use the transportation management system, in addition to, or alternatively with, a mobile application associated with the in-vehicle vending apparatus, in order to confirm and process the purchase.

Moreover, various components of the "smart" in-vehicle vending apparatus may help facilitate managing the inventory of items following the purchases in an automated and unobtrusive way. For example, hardware components including sensors, cameras, displays, and other relevant components may be used to determine which items were taken during a vending session, in addition to confirming that these items match the items requested by the user. In addition, data relating to items purchased by users may be used for machine-learning purposes to generate user-specific and region-specific inventory needs and intelligence to further enhance user experience and efficient inventory management and dispatch. The various examples of the capabilities of the "smart" in-vehicle vending apparatus will be discussed in more detail below.

Before describing the various capabilities of the "smart" in-vehicle vending apparatus in more detail, an overview of the transportation management system including the in-vehicle vending apparatus, and information regarding various relevant devices used in the ride provider's vehicle, are provided.

Figure 3:
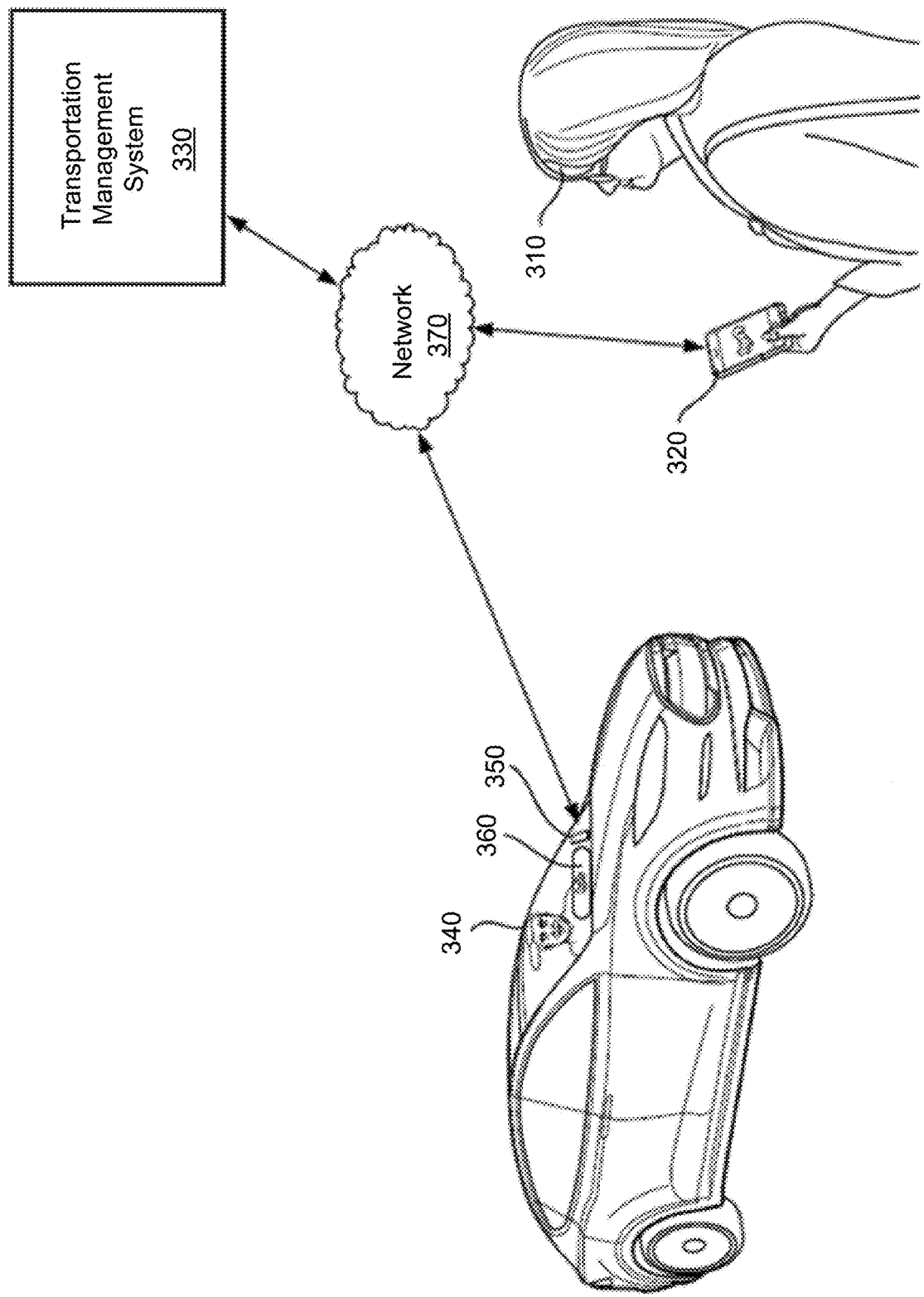
FIG. 3 illustrates an example of a transportation management system for matching ride requestors with ride providers.

FIG. 3 illustrates an example of a transportation management system 330 for matching ride requestors 310 and ride providers 340 for a ride service in accordance with particular embodiments described herein. The transportation management system 330 may be configured to communicate with both the requestor's 310 computing device 320 and the provider's 340 computing device 350. The provider computing device 350 may be configured to communicate with a transportation management vehicle device 360 that is configured to easily and efficiently provide information to a provider 340 and/or a requestor 310, obtain internal sensor data pertaining to the user compartment of the vehicle, and/or adjust configurations of the vehicle.

In particular embodiments, the requestor 310 may use a transportation application running on a requestor computing device 320 to request a ride from a specified pick-up location to a specified drop-off location. The request may be sent over a communication network 370 to the transportation management system 330. The ride request may include request information, which may include, for example, an identifier associated with the requestor and/or the requestor computing device, user information associated with the requestor, a location of the requestor computing device at the time of the request, a requested time for the ride (e.g., at a scheduled future time or an instant/current time), and/or any other relevant information for matching the ride request with ride providers as described herein. The ride request may also include transport information, such as, e.g., a pick-up location, a drop-off location, a "best fit/predictive" location (e.g., a particular location in the origination/destination region suitable for pick-up/drop-off at a given time), preferred pick-up/drop-off location type (e.g., a curb segment), or any other suitable information for indicating the requestor's transportation preferences and/or objectives. In particular embodiments, the ride request may further include any other preferences or needs of the requestor, including, for example, navigation preferences (e.g., highways vs. local streets; particular routes; stop overs), music or entertainment preferences (e.g., link to a music playlist or station hosted by a 3rd-party music provider, news station, etc.), personalized pattern/color to display on a transportation management vehicle device to help the ride provider and requestor identify each other, particular vehicle features or restrictions (e.g., pet friendly, child seat, wheelchair accessible, maximum/minimum user or cargo compartment, etc.).

In particular embodiments, the transportation management system 330 may, in response to a ride request, identify available providers that are registered with the transportation management system 330 through an application on their mobile computing device 350 or through an associated transportation management vehicle device 360. For example, the transportation management system 330 may locate candidate ride providers 340 who are available (e.g., based on a status indicator provided through each ride provider's 340 computing device 350) and in the general vicinity of the requested pick-up location (e.g., based on GPS data provided by the provider computing device 350 and the requestor computing device 320). The transportation management system 330 may send a notification relating to the requested ride to the computing devices 350 of the candidate ride providers 340. The notification may include information pertaining to the request, including, e.g., the pick-up and drop-off locations, recommended route, estimated time of travel, fees for the ride, the requestor's profile information (e.g., name, profile picture, ratings, etc.), particular ride requests (e.g., car seat availability), and any other pertinent information that would allow the ride provider 340 to make an informed decision as to whether to accept or reject the ride request. Upon seeing the notification, the provider 340 may accept or reject the ride request through the provider communication device 350. Additionally and/or alternatively, in particular embodiments, the provider 340 may be predictively and/or automatically matched with a ride request such that the provider 340 is not required to explicitly accept the request. For instance, the provider 340 may enter a mode where the provider 340 agrees to accept all requests that are sent to the provider 340 without the ability to decline and/or review requests before accepting.

In particular embodiments, the provider computing device 350 may notify the transportation management system 330 that the provider 340 received the notification and further inform the system 330 of whether the provider 340 accepted or rejected the request. The information sent to the system 330 may include, for example, an acceptance indicator (e.g., a flag), current location of the ride provider 340, route information for transporting other users in the vehicle in a ride-sharing scenario (e.g., the ride provider 340 may have agreed to transport different, unrelated ride requestors), schedule information regarding the ride provider's 340 future availability, diagnostics associated with the car (e.g., gas level, battery level, engine status, etc.), features, amenities, and/or limitations of the vehicle, and/or any other suitable information. In particular embodiments, the transportation management system 330 may make a further determination of the suitability of the match and select the best match for the ride requestor 310. In particular embodiments, the transportation management system 330 may provide the ride requestor 310 information pertaining to the ride providers 340 who accepted the request and allow the ride requestor 310 to select the desired provider 340. Once a match has been finalized, the provider 340 and the requestor 310 may receive information associated with the other party and relevant transport information, such as requestor 310 and provider 340 information (e.g., name, representative symbol or graphic, social-media profile, etc.), requested pick-up and drop-off locations, suggested route, current location tracking information, ratings, past ride history and reviews, and/or any other relevant information for facilitating the match and/or service being provided. In this manner, the transportation management system 330 may dynamically match ride requestors 310 and providers 340 that are distributed throughout a geographic area.

In particular embodiments, the transportation management system 330 may provide information to the ride requestor device 320 and the provider device 350 (and/or transportation management vehicle device 360) to facilitate the parties finding each other. For example, the system 330 may monitor the GPS locations of the requestor computing device 320 and provider computing device 350 and make the GPS location of one device available to the other device. For example, as the provider computing device 350 gets closer to the request location, the transportation management system may monitor the location of the provider computing device 350 and send the location of the requestor computing device 320 to the provider computing device 350 (and vice versa). As such, the provider computing device 350 may display the current location of the requestor computing device 320 to allow the provider 340 find and pick-up the requestor 310. In particular embodiments, the provider computing device 350 may determine a proximity vector between the present location of the provider computing device 350 and the location of the requestor computing device 320. Based on this information, the provider computing device 350 may provide navigating instructions to the provider 340 so that he/she may find the exact location of the requestor 310.

To further guide the provider 340 as he/she is driving, the transportation management system 330 and/or the provider computing device may determine and provide a proximity indicator (e.g., a color, pattern, image, animation, and/or pattern of colors) to be presented on a display visible to the provider 340. The display may be on the provider computing device 350, the transportation management vehicle device 360, and/or a display integrated with the vehicle. Proximity indicators may also include additional or other types of multimedia elements such as sounds, audio/visual presentations, haptic feedback (e.g., vibrations, etc.), holograms, augmented reality presentations, etc. The indicator provided by the transportation management vehicle device 360 may also be visible to the ride requestor 310 through the vehicle's windshield. In particular embodiments, the ride requestor 310, knowing or having been informed of the proximity indicator's characteristics (e.g., a particular color, greeting, animation, etc.), may look for such proximity indicator in nearby vehicles to find the ride provider 340. Similarly, the indicator may also be displayed on the requestor's computing device 320, and the requestor 310 may hold the device 320 so that nearby drivers could see the displayed proximity indicator for purposes of helping the parties locate each other.

In particular embodiments, an interaction indicator associated with the requestor 310 of a matched ride may be displayed based on the proximity between the requestor computing device 320 and the provider computing device 350. For example, when the parties are within a distance threshold of each other, an interaction indicator including a name, a graphic, and/or a greeting generated based on the requestor's information and/or provider's information may be presented on the provider computing device 350 and/or the transportation management vehicle device 360. Similar to the techniques described herein related to the proximity indicator, the interaction indicator may be displayed to provide a welcoming interaction to the requestor 310 upon the requestor 310 approaching and/or entering a vehicle of the provider 340. Similar to the proximity indicator, the interaction indicator may be displayed on any number of different displays within the provider vehicle and/or through the transportation management vehicle device 360. Additionally, the same techniques described herein regarding the provider computing device 350 may be implemented by the requestor computing device 320 to display an interaction indicator and/or proximity indicator on the requestor computing device 320 or an associated display.

Figure 4:
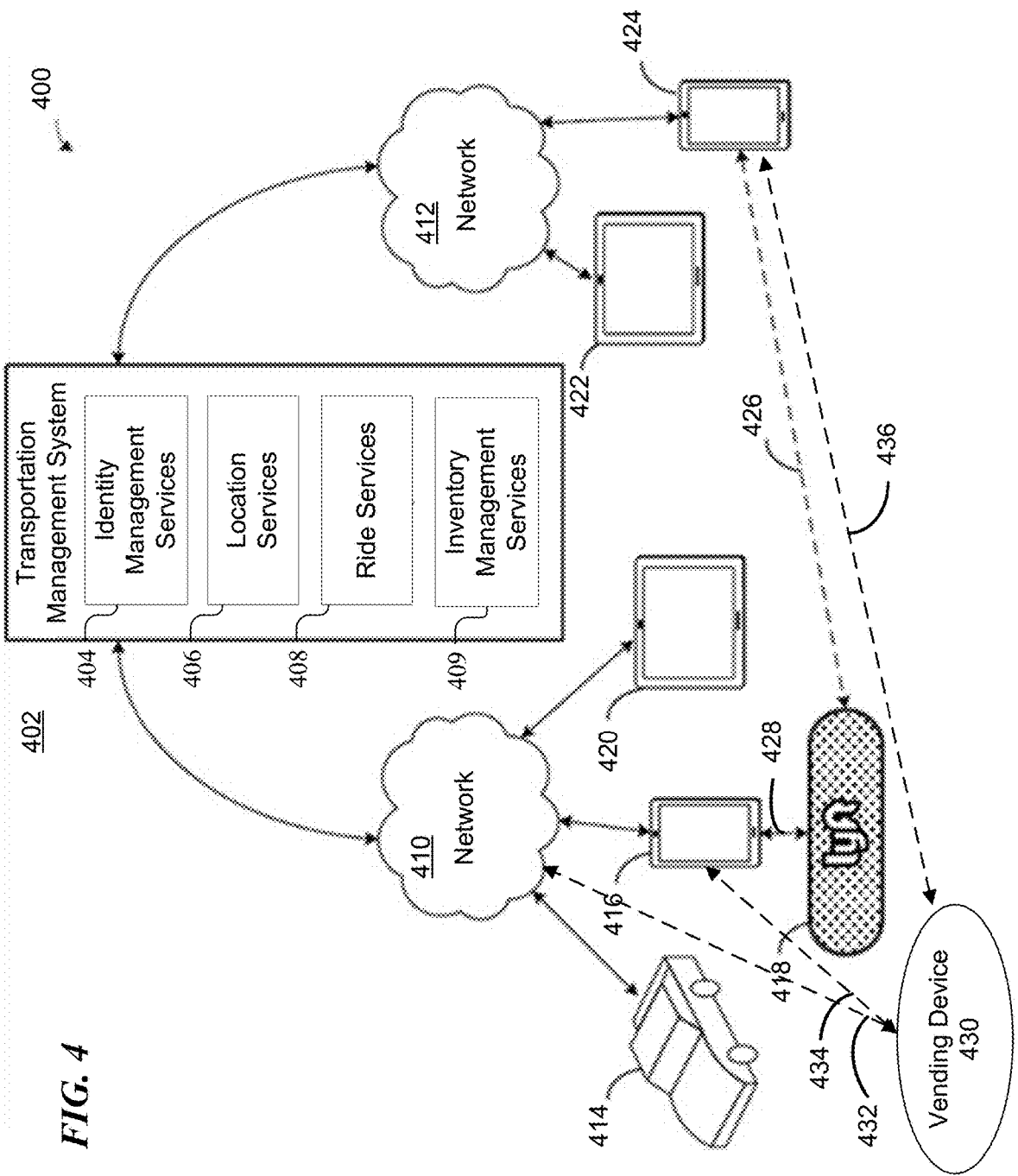
FIG. 4 illustrates an example block diagram of a transportation management environment.

FIG. 4 shows a transportation management environment 400, in accordance with particular embodiments. For example, a transportation management system 402 executing on one or more servers or distributed systems may be configured to provide various services to ride requestors and providers. In particular embodiments, the transportation management system 402 may include software modules or applications, including, e.g., identity management services 404, location services 406, ride services 408, inventory management services 409, and/or any other suitable services. Although a particular number of services are shown as being provided by system 402, more or fewer services may be provided in various embodiments. In addition, although these services are shown as being provided by the system 402, all or a portion of any of the services may be processed in a distributed fashion. For example, computations associated with a service task may be performed by a combination of the transportation management system 402 (including any number of servers, databases, etc.), one or more devices associated with the provider (e.g., devices integrated with the managed vehicles 414, provider's computing devices 416 and tablets 420, transportation management vehicle devices 418, and an example in-vehicle vending device 430), and/or one or more devices associated with the ride requestor (e.g., the requestor's computing devices 424 and tablets 422). In particular embodiments, the transportation management system 402 may include one or more general purpose computers, server computers, distributed computing systems, clustered computing systems, cloud-based computing systems, or any other computing systems or arrangements of computing systems. The transportation management system 402 may be configured to run any or all of the services and/or software applications described herein. In particular embodiments, the transportation management system 402 may include an appropriate operating system as well as various server applications, such as web servers capable of handling hypertext transport protocol (HTTP) requests, file transfer protocol (FTP) servers, database servers, etc.

In particular embodiments, identity management services 404 may be configured to, e.g., perform authorization services for requestors and providers and manage their interactions and data with the transportation management system 402. This may include, e.g., authenticating the identity of providers and determining that they are authorized to provide services through the transportation management system 402. Similarly, requestors' identities may be authenticated to determine whether they are authorized to receive the requested services through the transportation management system 402. Identity management services 404 may also manage and control access to provider and requestor data maintained by the transportation management system 402, such as driving and/or ride histories, vehicle data, personal data, preferences, usage patterns as a ride provider and as a ride requestor, profile pictures, linked third-party accounts (e.g., credentials for music or entertainment services, social-networking systems, calendar systems, task-management systems, etc.) and any other associated information. The management service 404 may also manage and control access to provider/requestor data stored with and/or obtained from third-party systems. For example, a requester or provider may grant the transportation management system 402 access to a third-party email, calendar, or task management system (e.g., via the user's credentials). As another example, a requestor or provider may grant, through his/her mobile device (e.g., 416, 420, 422, and 424), a transportation application associated with the transportation management system 402 access to data provided by other applications installed on the mobile device. Such data may be processed on the client and/or uploaded to the transportation management system 402 for processing, if so desired.

In particular embodiments, the transportation management system 402 may provide location services 406, which may include navigation and/or traffic management services and user interfaces. For example, the location services 406 may be responsible for querying devices associated with the provider (e.g., vehicle 414, computing device 416, tablet 420, transportation management vehicle device 418) and the requester (e.g., computing device 424 and tablet 422) for their locations. The location services 406 may also be configured to track those devices to determine their relative proximities, generate relevant alerts (e.g., proximity is within a threshold distance), generate navigation recommendations, and any other location-based services.

In particular embodiments, the transportation management system 402 may provide ride services 408, which may include ride matching and management services to connect a requestor to a provider. For example, after the identity of a ride requestor has been authenticated by the identity management services module 404, the ride services module 408 may attempt to match the requestor with one or more ride providers. In particular embodiments, the ride services module 408 may identify an appropriate provider using location data obtained from the location services module 406. The ride services module 408 may use the location data to identify providers who are geographically close to the requestor (e.g., within a certain threshold distance or travel time) and further identify those who are a good match with the requestor. The ride services module 408 may implement matching algorithms that score providers based on, e.g.: preferences of providers and requestors; vehicle features, amenities, condition, and status; provider's preferred general travel direction, range of travel, and availability; requestor's origination and destination locations, time constraints, and vehicle feature needs; and any other pertinent information for matching requestors with providers. In particular embodiments, the ride services 408 may use rule-based algorithms or machine-learning models for matching requestors and providers.

In particular embodiments, the transportation management system 402 may provide inventory management services 409, which may include item-inventory data and management services and user interfaces associated with the in-vehicle vending device 430. For example, after the identity of a ride requestor has been authenticated by the identity management services module 404, the inventory management services module 409 may update the inventory information with a list of items available in the vending device 430, and send this list of items to the requester (e.g., via a user interface on computing device 424). In particular embodiments, after the requestor has taken one or more items from the vending device 430, the inventory management services module 409 may receive updated inventory data from the vending device 430 and the update the item-inventory data. The inventory management services module 409 may implement predictive-inventory-management algorithms that score items in the item-inventory data based on, e.g., preferences of providers and requestors; geographic vehicle features, amenities, condition, and status; provider's preferred general geographic location and travel direction, range of travel, and availability; requestor's origination and destination geographic locations, time constraints, and vehicle feature needs; other landmarks and points-of-interest associated with geographic locations; any other pertinent information for matching requestors with providers; or any combination thereof. In particular embodiments, the inventory management services 409 may use rule-based algorithms or machine-learning models for stocking one or more items for particular geographic regions; dispatching additional items to ride providers; matching particular requestors with particular providers based on the item inventory associated with the particular providers; and any other relevant implementations for maximizing user experience based on items available in the vending device 430.

The transportation management system 402 may communicatively connect to various devices through networks 410 and 412. Networks 410, 412 may include any combination of interconnected networks configured to send and/or receive data communications using various communication protocols and transmission technologies. In particular embodiments, networks 410, 412 may include local area networks (LAN), wide-area network, and/or the Internet, and may support communication protocols such as transmission control protocol/Internet protocol (TCP/IP), Internet packet exchange (IPX), systems network architecture (SNA), and any other suitable network protocols. In particular embodiments, data may be transmitted through networks 410, 412 using a mobile network (such as a mobile telephone network, cellular network, satellite network, or another mobile network), PSTNs (a public switched telephone networks), wired communication protocols (e.g., USB, CAN), and/or wireless communication protocols (e.g., WLAN technologies implementing the IEEE 802.11 family of standards, Bluetooth, Bluetooth Low Energy, NFC, Z-Wave, and ZigBee). In particular embodiments, networks 410, 412 may each include any combination of networks described herein or known to one of ordinary skill in the art.

In particular embodiments, devices within a vehicle may be interconnected. For example, any combination of the following may be communicatively connected: vehicle 414, provider computing device 416, provider tablet 420, transportation management vehicle device 418, vending device 430, requestor computing device 424, requestor tablet 422, and any other device (e.g., smart watch, smart tags, etc.). For example, the transportation management vehicle device 418 may be communicatively connected to the provider computing device 416 and/or the requestor computing device 424. In particular embodiments, the transportation management vehicle device 418 may connect 426, 428 to those devices, and the in-vehicle vending device 430 may connect 432, 434, 436 to those devices, via any suitable communication technology, including, e.g., WLAN technologies implementing the IEEE 802.11 family of standards, Bluetooth, Bluetooth Low Energy, NFC, Z-Wave, ZigBee, and any other suitable short-range wireless communication technology.

In particular embodiments, users may utilize and interface with one or more services provided by the transportation management system 402 using applications executing on their respective computing devices (e.g., 414, 416, 418, 420 and/or 430), which may include mobile devices (e.g., an iPhone®, an iPad®, mobile telephone, tablet computer, a personal digital assistant (PDA)), vending apparatuses, laptops, wearable devices (e.g., smart watch, smart glasses, head mounted displays, etc.), thin client devices, gaming consoles, and any other computing devices. In particular embodiments, provider computing device 414 may be an add-on device to the vehicle, such as a vehicle navigation system, or a computing device that is integrated with the vehicle, such as the management system of an autonomous vehicle. The computing device may run on any suitable operating systems, such as Android®, iOS®, macOS®, Windows®, Linux®, UNIX®, or UNIX®-based or Linux®-based operating systems, or any other type of operating system or firmware. The computing device may further be configured to send and receive data over the Internet, short message service (SMS), email, and various other messaging applications and/or communication protocols. In particular embodiments, one or more software applications may be installed on the computing device of a provider or requestor, including an application associated with the transportation management system 402. The transportation application may, for example, be distributed by an entity associated with the transportation management system via any distribution channel, such as an online source from which applications may be downloaded and/or via physical media, such as CDs and DVDs. Additional third-party applications unassociated with the transportation management system may also be installed on the computing device. In particular embodiments, the transportation application may communicate or share data and resources with one or more of the installed third-party applications.

Figure 5:
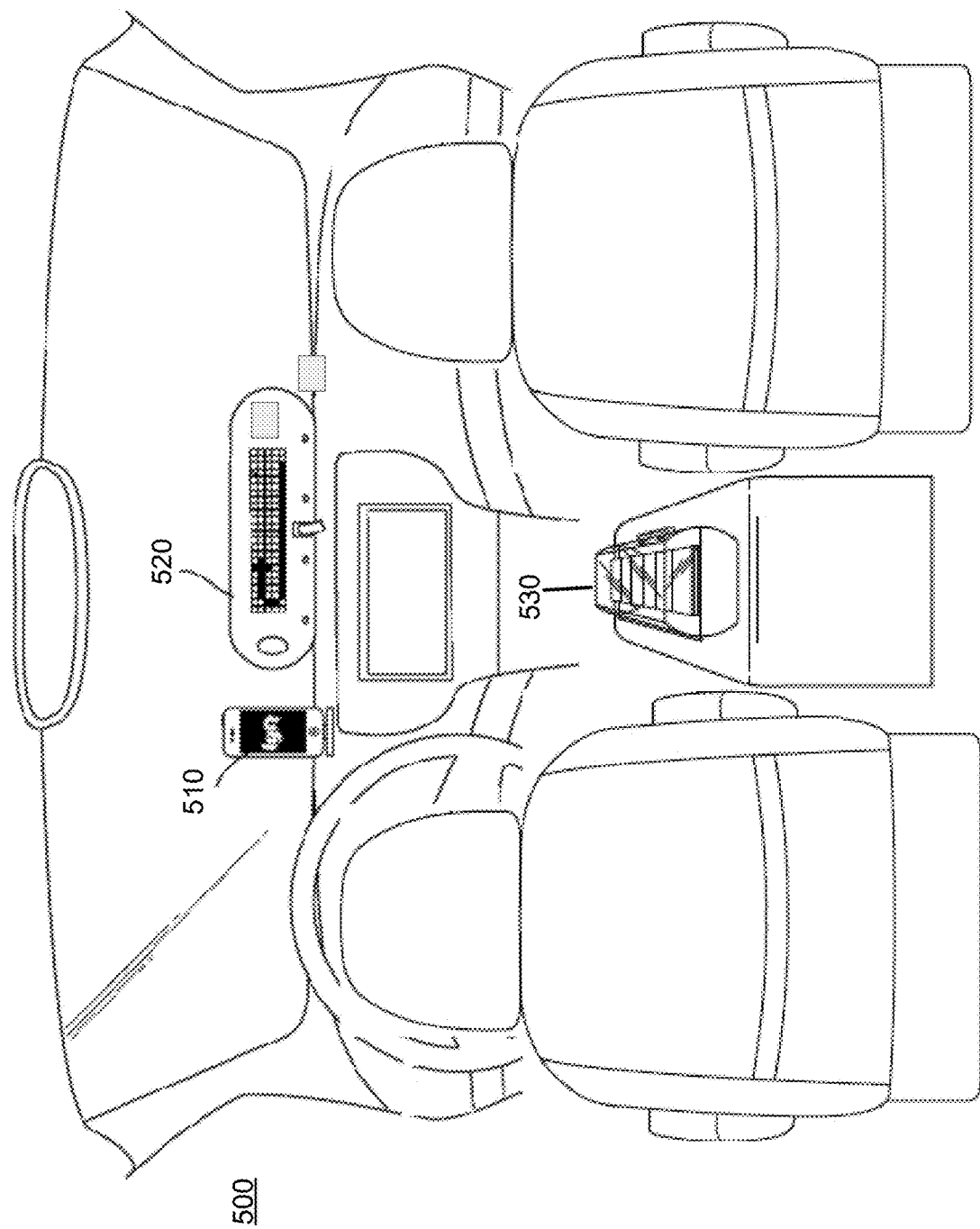
FIG. 5 illustrates an example configuration of various devices in a ride provider's vehicle.

FIG. 5 illustrates an example configuration of various devices in a ride provider's vehicle 500. In the example shown, the provider computing device 510 is held by a mobile device holder so that the display of the provider computing device 510 is visible to the ride provider (or driver) and any of the other users in the vehicle. A provider communication device 520 may be similarly positioned so that its interior interface can be seen by the users. An in-vehicle vending apparatus 530 may be positioned on an armrest area between the front driver seat and the front user seat so that it can be seen and accessed by the front user in addition to one or more back users. In particular embodiments, the provider computing device 510, the (e.g., a transportation management vehicle device), and/or the in-vehicle vending apparatus 530 may include sensors for monitoring the user compartment of the vehicle (as used herein, "user compartment" refers to the area of a vehicle designed and intended for the seating of the driver and other users). Examples of sensors may include at least the following: cameras for capturing visible data; microphones for capturing audible data; infrared sensors for detecting heat emitted by users; gyroscopes and accelerometers for detecting vehicle motion; and any other sensors suitable for detecting environmental signals occurring in the user compartment of the vehicle. In particular embodiments, such sensors may be integrated with the vehicle (e.g., traditional human-driven vehicles or autonomous vehicles) or with a detachable device, such as the provider communication device 520 and/or the in-vehicle vending apparatus 530. The sensors may be located at any suitable location, such as in the upper corners of the user compartment, the dashboard, seats, side doors, ceiling, rear view mirror, central console, floor, within the in-vehicle vending apparatus 530, or any other location where the sensor would be effective in detecting the type of signals it is designed for.

Figure 6A:
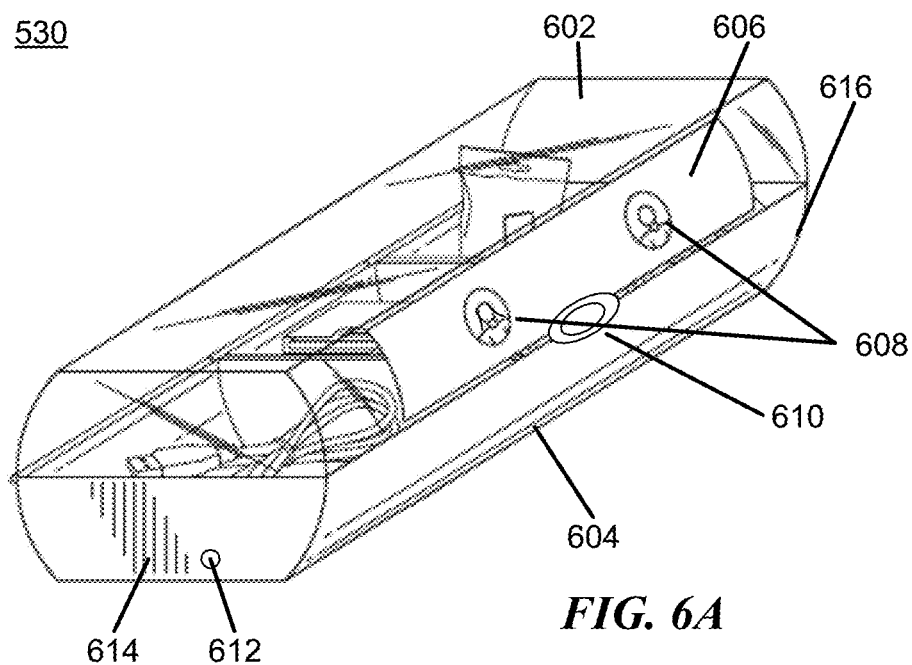
FIG. 6A illustrates an example of the outside components of an in-vehicle vending apparatus.

FIG. 6A illustrates an example of the outside components of an in-vehicle vending apparatus 530 in accordance with embodiments described herein. The in-vehicle vending apparatus 530 may include a top surface 602 and a bottom surface 604. In particular embodiments, the top surface 602 may be made of a clear material (e.g., a clear plastic) so that the inside contents of the in-vehicle vending apparatus 530 are visible to the users. As shown in FIG. 6A, the top surface 602 may include a display area 606, which may include various display technologies such as, but not limited to, one or more liquid crystal displays (LCDs), one or more arrays of light emitting diodes (LEDs), AMOLED, or other display technologies. In particular embodiments, the display area 606 may be divided into multiple regions, and separate displays may be associated with each of these multiple regions. In particular embodiments, display area 606 may be configured to show colors, text, animation, patterns, color patterns, or any other suitable identifying information to users. As an example, as shown in FIG. 6A, the display area 606 may include one or more interactive buttons 608 representative of each of the users in a car, which a user may select to identify themselves and/or initiate a vending session to access the contents of the in-vehicle vending apparatus 530. In particular embodiment, the in-vehicle vending apparatus 530 may have a latch 610 to facilitate the opening and closing of the in-vehicle vending apparatus 530, which may also have an associated locking mechanism for locking the in-vehicle vending apparatus 530. In particular embodiment, the in-vehicle vending apparatus 530 may include a microphone 612 for receiving audio inputs, and a speaker 614 for broadcasting audio outputs (e.g., a beep to notify users that the in-vehicle vending apparatus 530 is locked until a required action is completed).

In particular embodiments, the in-vehicle vending apparatus 530 may include a connector 616 (not shown). In particular embodiments, the connector 616 may be configured to physically connect to the ride provider's computing device and/or the requestor's computing device. In particular embodiments, the connector 616 may be configured for physically connecting the transportation management vehicle device 660 to the vehicle for power and/or for communicating with the vehicle. As an example, the connector 616 may implement the CAN (Controller Area Network) bus interface or any other suitable communication interface or protocol for communicating with a vehicle. As another example, the connector 616 may include a CAN bus interface that may be utilized in communicating with a vehicle. For example, the CAN bus interface may interface with an on-board diagnostics (OBD) port (e.g., an OBD-I port, an OBD-II port, etc.) of the vehicle. In particular embodiments, through the connector 616, the in-vehicle vending apparatus 530 may be able to issue instructions to the vehicle's onboard computer and cause it to perform certain actions, such as launching a particular mobile application (e.g., an application associated with the in-vehicle vending apparatus 530), requesting the vehicle's onboard computer to launch the particular mobile application, sending inventory information and/or inventory requests from the in-vehicle vending apparatus 530, and any other relevant data and/or commands to the vehicle. As yet another example, the connector 616 may enable the in-vehicle vending apparatus 530 to query the vehicle for certain data, such as a request to authenticate a user who wants to purchase items from the in-vehicle vending apparatus 530, current inventory lists, and any other information available through the vehicle's computing system. In particular embodiments, the in-vehicle vending apparatus 530 may be further configured with wireless communication capabilities (e.g., Bluetooth, WI-FI, NFC, etc.), thereby enabling the in-vehicle vending apparatus 530 to wirelessly communicate with the vehicle, the provider's computing device, and/or the requestor's computing device.

Figure 6B:
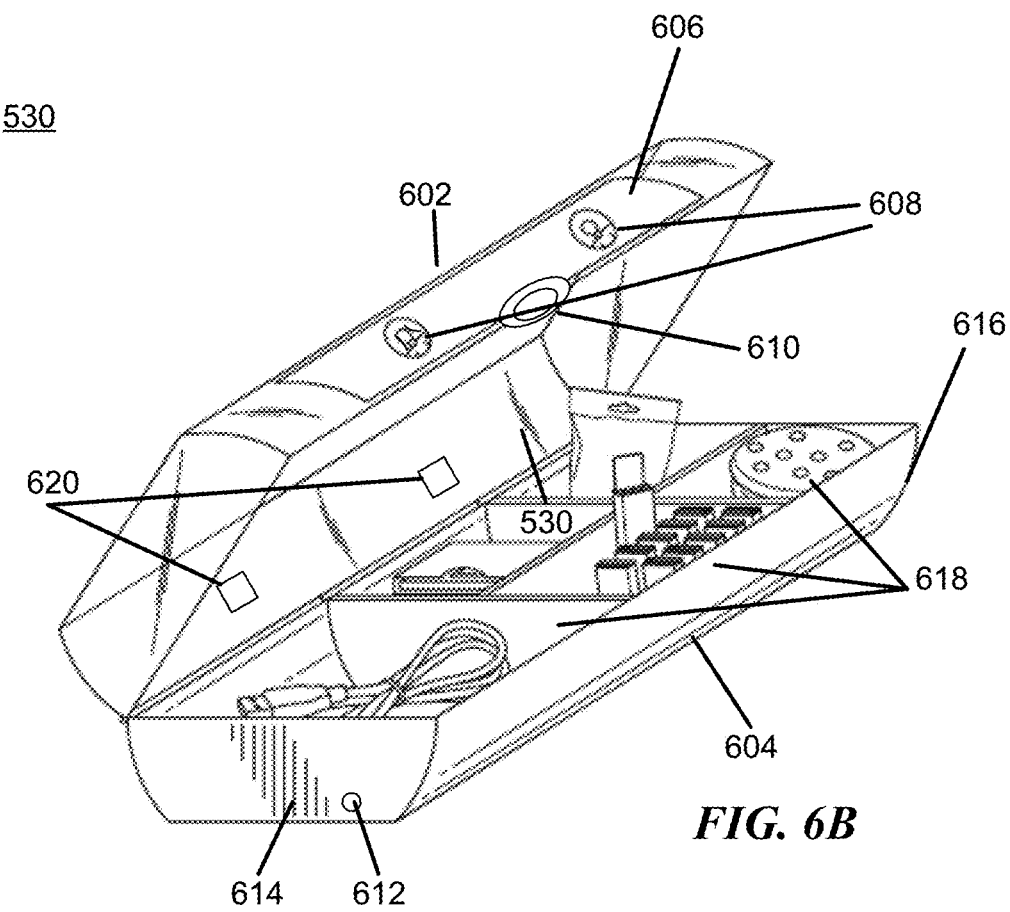
FIG. 6B illustrates an example of the inside components of the in-vehicle vending apparatus.

FIG. 6B illustrates an example of the inside components of the in-vehicle vending apparatus 530 in accordance with embodiments described herein. In particular embodiments, there may be one or more compartments 618 to hold separate items (e.g., food including items such as candy, nuts, gum, drinks, in addition to non-food items such as phone chargers, earplugs, etc.). In particular embodiments, the in-vehicle vending apparatus 530 may be integrated with one or more sensors 620, such as a camera, weight/load sensor, infrared sensor, radio-frequency (RF) sensor, gyroscope, accelerometer, and any other suitable sensor for detecting signals of interest within the user compartment of the vehicle. As an example, the sensor 620 may be a camera located on the inside of the top surface 602, and may scan and capture a picture of the items in the in-vehicle vending apparatus 530 before a user opens the apparatus 530 to take one or more items, and after the user closes the vending apparatus 530 after taking the one or more items, to determine and/or confirm which items were taken during the vending session. Alternatively, the camera may be located on a side surface of the in-vehicle vending apparatus 530. As another example, the sensor 620 may be a microphone that captures conversation and/or commands from the users (e.g., a request for access based on voice command). As yet another example, the sensor 620 may be an infrared sensor capable of detecting motion of the users (e.g., to register a motion the user makes to request access to the in-vehicle vending apparatus 530, a motion the user makes with his/her requestor computing device 320 toward the in-vehicle vending apparatus 530 to request authorization, etc.). As yet another example, the sensor 620 may be a weight/load sensor located at the bottom surface 604 of the in-vehicle vending apparatus 530 for detecting a weight change to identify which items were taken during a vending session. As yet another example, the sensor 620 may be a RF sensor, e.g., for reading RFID or other relevant identification tags on items for determining which items were taken during a vending session.

Although FIGS. 6A and 6B illustrate particular numbers of components (e.g., a single sensor 620, a single display area 606, a single connector 616, etc.), one of ordinary skill in the art would appreciate that any suitable number of each type of component may be included in the in-vehicle vending apparatus 530. For example, in particular embodiments, the in-vehicle vending apparatus 530 may include one or more of a camera, microphone, infrared sensor, weight/load sensor, and electromagnetic sensor. As another example, the in-vehicle vending apparatus 530 may include one or more communication interfaces, whether wired or wireless.

Figure 6C:
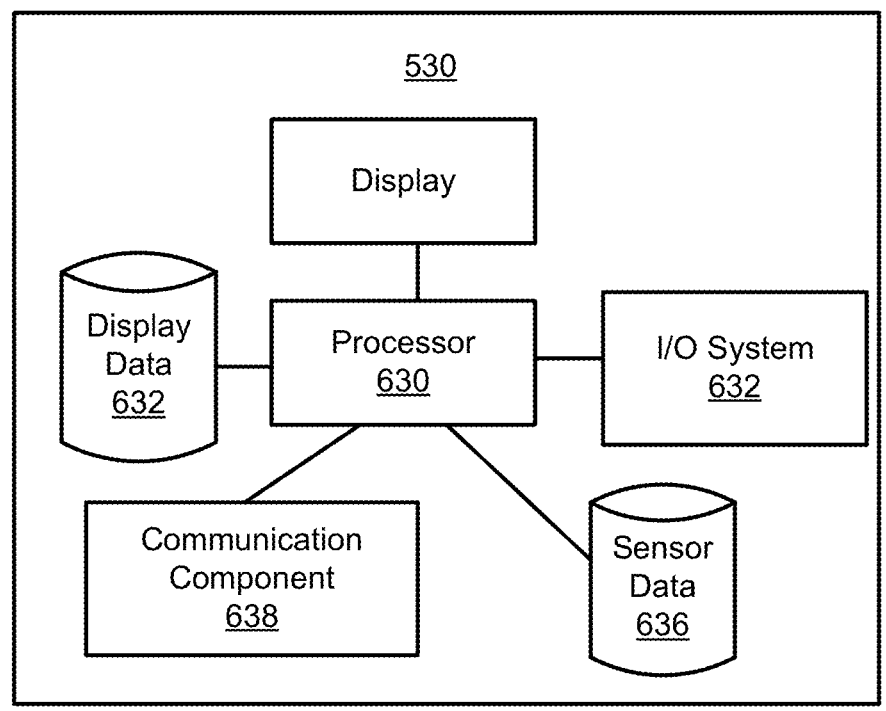
FIG. 6C shows a block diagram of various components of the in-vehicle vending apparatus.

FIG. 6C shows a block diagram of various components of the in-vehicle vending apparatus 530 in accordance with particular embodiments. As shown in FIG. 6C, the in-vehicle vending apparatus 530 may include a processor 630. Processor 630 may control information displayed on the display area 606 (e.g., for presenting information and authenticating users, as discussed below). In particular embodiments, display data 632 may include stored user information (e.g., user pictures), patterns, sequences, colors, text, animation or other data to be displayed on the display 606. The display data 632 may also include algorithms for generating content and controlling how it is displayed. The generated content, for example, may be personalized based on information received from the transportation management system 402, the in-vehicle vending apparatus 530, any third-party system, the vehicle, and the computing devices of the provider and/or requestor. In particular embodiments, display data 632 may be stored on a hard disk drive, solid-state drive, memory, or any other storage device.

In particular embodiments, the in-vehicle vending apparatus 530 may include an input/output system 634 configured to receive inputs from users and/or the environment and provide output. For example, I/O system 634 may include a sensor such as an image-capturing device configured to recognize motion or gesture-based inputs from users, a weight/load sensor configured to detect a change in weight associated with the contents of the in-vehicle vending apparatus 530 during a vending session, a RF sensor configured to detect the removal of items during a vending session, a microphone configured to detect and record speech or dialog uttered, and any other suitable sensor. The I/O system 634 may output the detected sensor data to any other system, including the transportation management system, the computing devices of the ride provider and requestor, etc. Additionally, I/O system 634 may include an audio device configured to provide audio outputs (such as alerts, instructions, or other information) to users and/or receive audio inputs, such as audio commands, which may be interpreted by a voice recognition system or any other command interface. In particular embodiments, I/O system 634 may include one or more input or output ports, such as USB (universal serial bus) ports, lightning connector ports, or other ports enabling users to directly connect their devices to the provider communication device 520 (e.g., to exchange data, verify identity information, provide power, etc.). In particular embodiments, sensor data 636 may include stored sensor information collected from I/O system 634, and may also include algorithms for generating and/or determining updated inventory information based on the data collected from the sensors. In particular embodiments, sensor data 636 may be stored on a hard disk drive, solid-state drive, memory, or any other storage device.

In particular embodiments, the in-vehicle vending apparatus 530 may include a communication component 638 for managing communications with other systems, including, e.g., the provider device, the requestor device, the vehicle, the transportation management system, and/or or relevant third-party systems (e.g., inventory item providers, inventory management services, etc.). In particular embodiments, communication component 638 may be configured to communicate over WI-FI, Bluetooth, NFC, RF, or any other wired or wireless communication network or protocol. Although this disclosure describes using an in-vehicle vending apparatus 530 in a particular manner, this disclosure contemplates using the in-vehicle vending apparatus 530 in any suitable manner.

Figure 7:
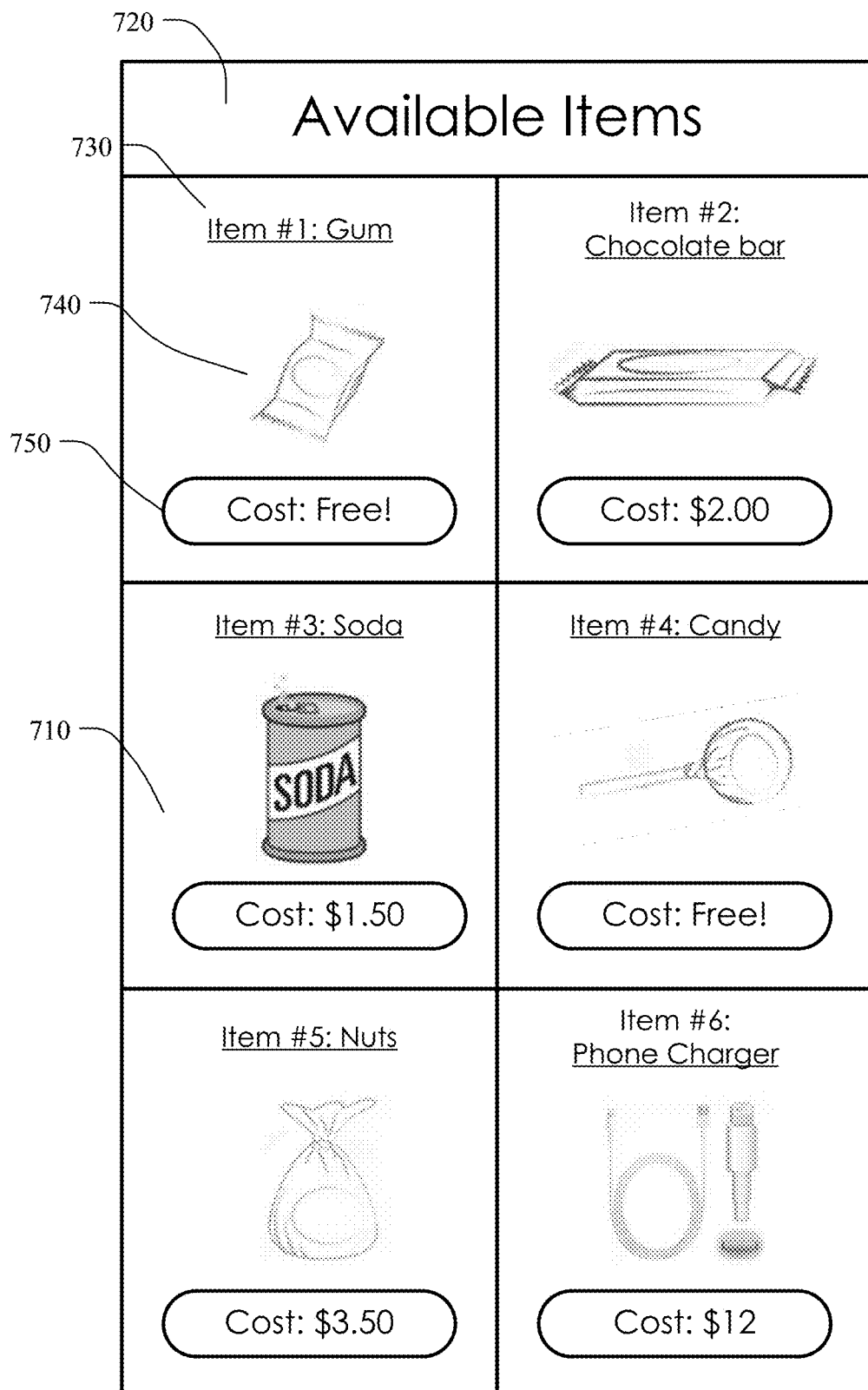
FIG. 7 illustrates an example user interface of a mobile application for use on a mobile device.

FIG. 7 illustrates an example user interface of a mobile application 700 for use by the ride requestor 310 on the requestor computing device 320 during his/her ride (i.e., during the time period when he/she is a user in the vehicle of the ride provider 340) in accordance with embodiments described herein. In particular embodiments, the mobile application 700 may include a user interface 710 that displays a notification 720 to the user (e.g., "Available Items"), in addition to one or more items that are available either free of charge or for purchase. As an example, the user interface 710 may display the one or more items using a caption 730 associated with each item (e.g., displaying "Item #1, Gum," "Item #2: Chocolate bar," "Item #3: Soda," etc.), along with a picture 740 of the item, and a cost indicator 750 displaying the cost of the item. In particular embodiments, the user may use the information displayed on the user interface 710 to help them make decisions on what items to purchase from the in-vehicle vending apparatus 530. In particular embodiments, the cost indicator 750 may be an interactive button that the user may interact with (e.g., by pressing the button) to add the item to a list of items he/she may want to purchase. After the user finishes selecting the items from the in-vehicle vending apparatus 530, the cost of all items are added up and a receipt with an itemized list of the purchase is sent to the user, as discussed in more detail below. Although this disclosure describes a user interacting with a user interface of a mobile application 700 in a particular manner, this disclosure contemplates the user interacting with the user interface of the mobile application 700 in any suitable manner.

FIGS. 8A-8C show an example provider communication device 520 in accordance with embodiments described herein. The provider communication device 520 may include a front view 802 (FIG. 8A) and a rear view 808 (FIG. 8B). In particular embodiments, the front view 802 may be designed to face the outside of the vehicle so that it is visible to, e.g., ride requestors, and the rear view 808 may be designed to face the interior of the vehicle so that it is visible to, e.g., the users. As shown in FIG. 8A, a front view 802 of the provider communication device 520 may include a front display 804. In particular embodiments, the front display 804 may include a secondary region or separate display 806. As shown in FIG. 8A, the front display 804 may include various display technologies including, but not limited to, one or more liquid crystal displays (LCDs), one or more arrays of light emitting diodes (LEDs), AMOLED, or other display technologies. In particular embodiments, the front display 804 may be configured to show colors, text, animation, patterns, color patterns, or any other suitable identifying information to requestors and other users external to a provider vehicle (e.g., at a popular pick-up location, requestors may quickly identify their respective rides and disregard the rest based on the identifying information shown). In particular embodiments, the secondary region or separate display 806 may be configured to display the same, or contrasting, information as front display 804.

FIG. 8B shows an embodiment of the rear view 808 of the provider communication device 520. As shown, the rear view 808 in particular embodiments may include a rear display 810. As with the front display 804, the rear display 810 may include the various display technologies discussed above. The rear display 880 may be configured to display information to the provider, the requestor, or other users in the user compartment of the vehicle. In particular embodiments, rear display 810 may be configured to provide information to people who are external to and behind the provider vehicle. Information may be conveyed via, e.g., scrolling text, color, patterns, animation, and any other visual display. As further shown in FIG. 8B, the provider communication device 520 may include a power button 812 or any other suitable user interface that can be used to turn the device 520 on or off. Additionally, the provider communication device 520 may include one or more light features 814 (such as one or more LEDs or other light sources) configured to illuminate areas adjacent to the device 520 and/or provide status signals. In particular embodiments, the provider communication device 520 may include a connector 816, which provides similar functionalities as the connector 616 associated with the in-vehicle vending apparatus 530, as discussed in detail above.

In particular embodiments, the provider communication device 520 may be integrated with one or more sensors 819, such as a camera, microphone, infrared sensor, gyroscope, accelerometer, and any other suitable sensor for detecting signals of interest within the user compartment of the vehicle. For example, the sensor 819 may be a rear-facing wide-angle camera that captures the user compartment and any users therein. As another example, the sensor 819 may be a microphone that captures conversation and/or sounds in the user compartment. The sensor 819 may also be an infrared sensor capable of detecting motion and/or temperature of the users. As with FIG. 6C, although FIG. 8B illustrates particular numbers of components (e.g., a single sensor 819, a single display 810, a single connector 816, etc.), one of ordinary skill in the art would appreciate that any suitable number of each type of component may be included in the provider communication device 520.

FIG. 8C shows a block diagram of various components of a provider communication device 520 in accordance with particular embodiments. As shown in FIG. 8C, the provider communication device 520 may include a processor 818. Processor 818 may control information displayed on rear display 810 and front display 804. As described herein, each display may be designed to display information to different intended users, depending on the positioning of the users and the provider communication device 520. In particular embodiments, display data 820 may include stored display patterns, sequences, colors, text, animation or other data to be displayed on the front and/or rear display. The display data 820 may also include algorithms for generating content and controlling how it is displayed. The generated content, for example, may be personalized based on information received from the transportation management system, any third-party system, the vehicle, and the computing devices of the provider and/or requestor. In particular embodiments, display data 820 may be stored on a hard disk drive, solid-state drive, memory, or any other storage device. In particular embodiments, lighting controller 822 may manage the colors and/or other lighting displayed by light features 814, the front display 804, and/or the back display 810.

In particular embodiments, the provider communication device 520 may include a communication component 824 for managing communications with other systems, including, e.g., the provider device, the requestor device, the vehicle, the transportation management system, and third-party systems (e.g., music, entertainment, traffic, and/or maps providers). In particular embodiments, communication component 824 may be configured to communicate over WI-FI, Bluetooth, NFC, RF, or any other wired or wireless communication network or protocol. In particular embodiments, similarly to the in-vehicle vending apparatus 530, ride-service device 520 may include an input/output system 826 configured to receive inputs from users and/or the environment and provide output. In particular embodiments, I/O system 826 may include one or more input or output ports, such as USB (universal serial bus) ports, lightning connector ports, or other ports enabling users to directly connect their devices to the provider communication device 520 (e.g., to exchange data, verify identity information, provide power, etc.). Although this disclosure describes using an provider communication device 520 in a particular manner, this disclosure contemplates using the provider communication device 520 in any suitable manner.

Figure 9:
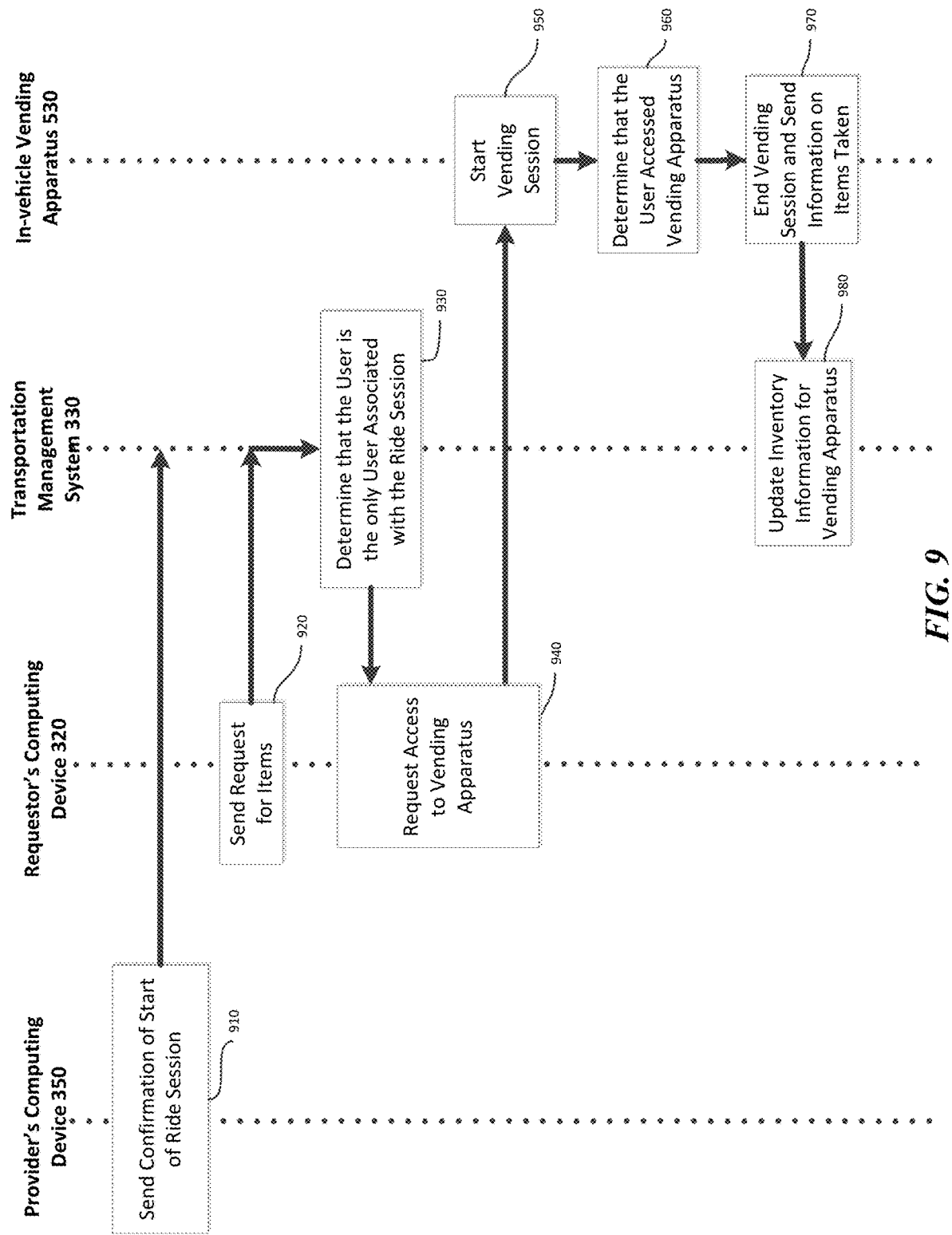
FIG. 9 illustrates an example method for interacting with the in-vehicle vending apparatus when there is only one user associated with a ride.
Figure 10:
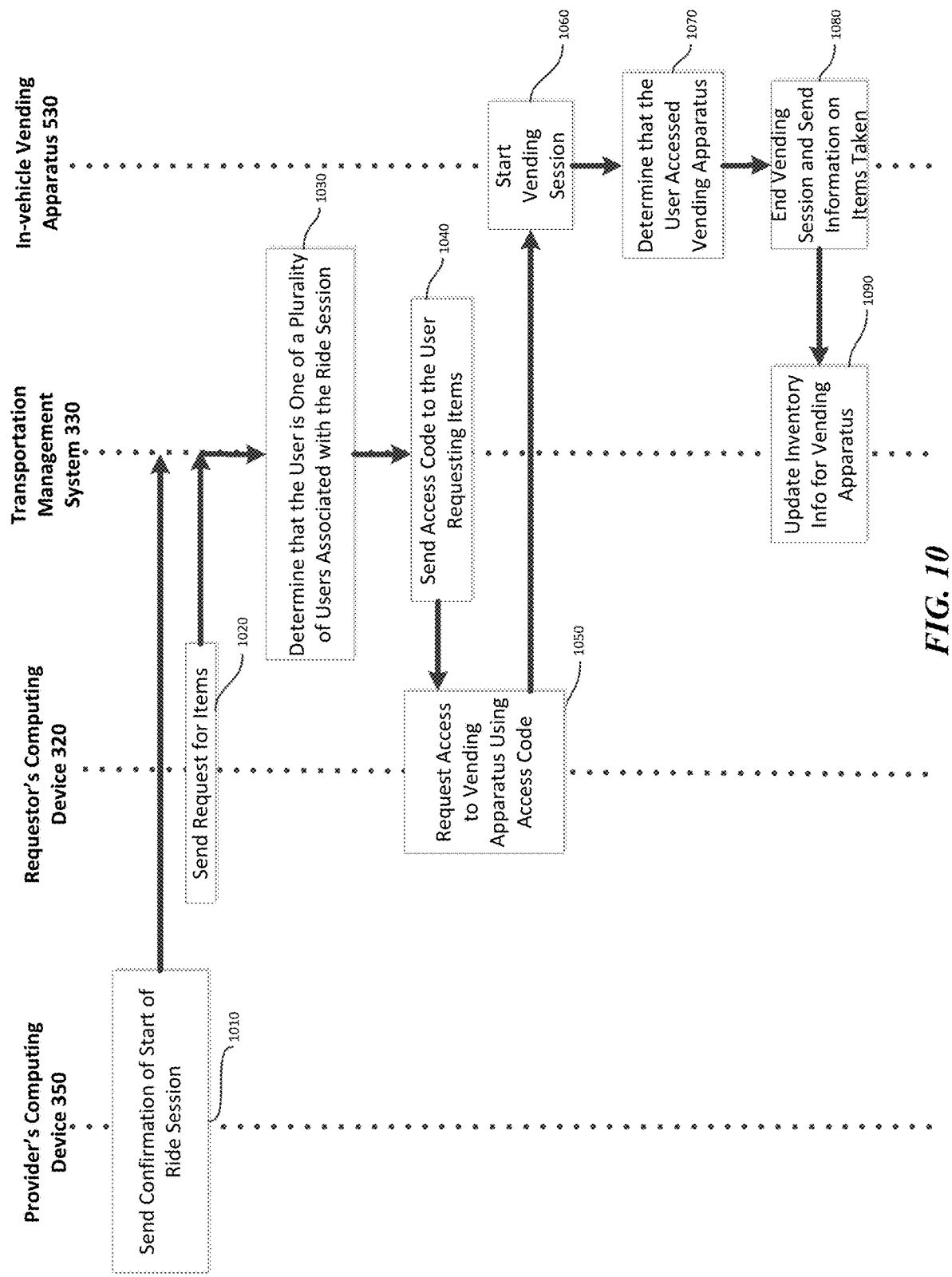
FIG. 10 illustrates an example method for interacting with the in-vehicle vending apparatus when there are multiple users associated with a ride.
Figure 11:
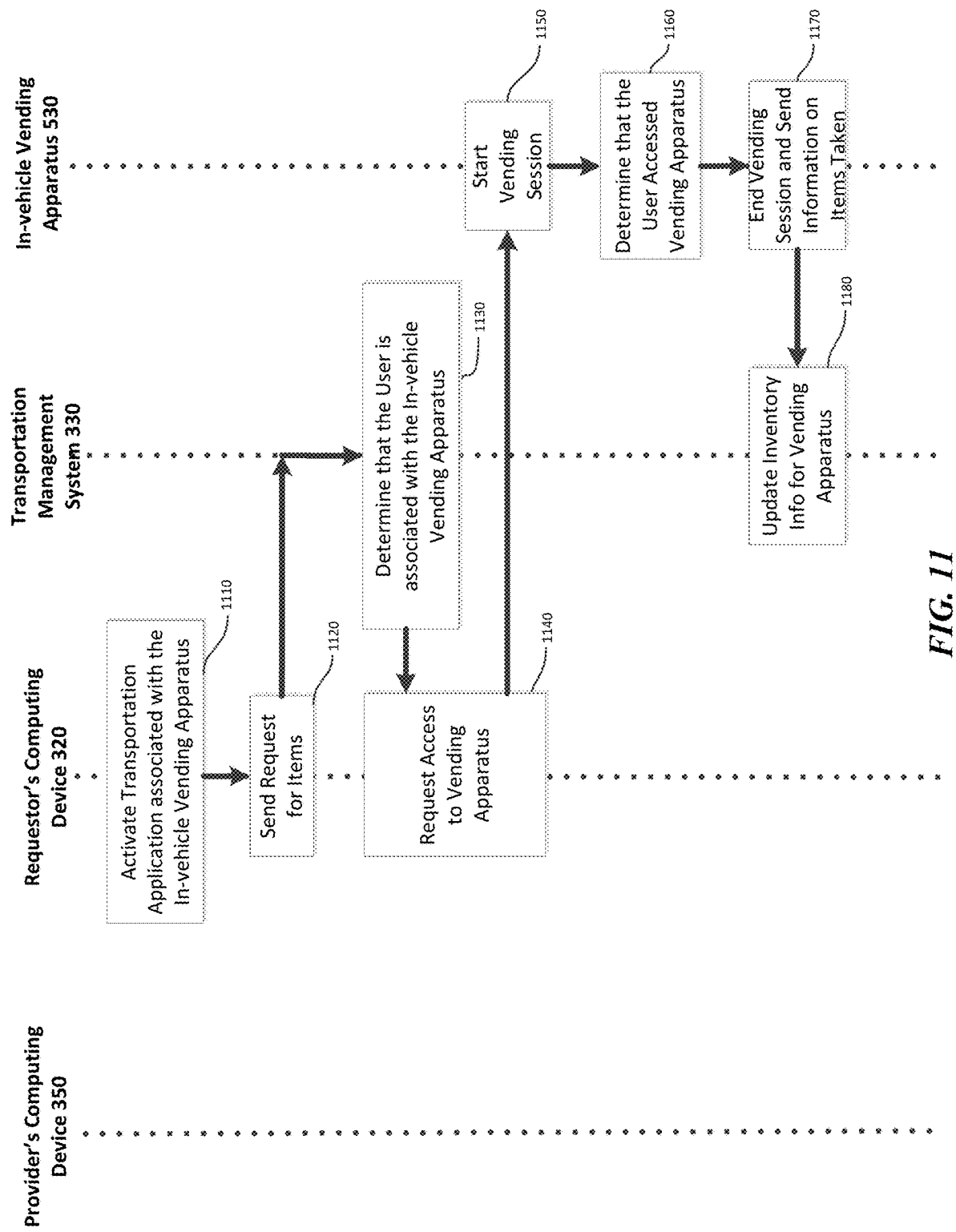
FIG. 11 illustrates an example method for interacting with the in-vehicle vending apparatus when there are no users associated with a ride.

FIGS. 9-11 illustrate examples of one or more users using the in-vehicle vending apparatus 530 in order to select and/or purchase one or more items. In particular embodiments, the ride requestor 310 may use a transportation application running on a requestor computing device 320 to request a ride from a specified pick-up location to a specified drop-off location from the ride provider 340. As discussed above, the request may be sent over a communication network 370 to the transportation management system 330, and may include request information such as, for example, an identifier associated with the requestor and/or the requestor computing device, user information associated with the requestor, a location of the requestor computing device at the time of the request, a requested time for the ride (e.g., at a scheduled future time or an instant/current time), and/or any other relevant information for matching the ride request with ride providers. In response to the ride request, the transportation management system 330 may identify available providers that are registered with the transportation management system 330 through an application on their mobile computing device 350 (e.g., mobile application 700). In particular embodiments, the provider computing device 350 may notify the transportation management system 330 that the provider 340 received the notification and accepted the request. Once a match has been finalized, the provider 340 and the requestor 310 may receive information associated with the other party and relevant transport information, such as requestor 310 and provider 340 information, and the provider 340 navigates to the pick-up location to pick-up the requester 310 (i.e., the user).

In particular embodiments, after the user starts the ride, the user may decide that he/she would like to purchase one or more items from the in-vehicle vending apparatus 530. As an example, and the user may communicate with the transportation management system 330, in-vehicle vending apparatus 530, or a combination there to purchase the one or more items. FIG. 9 illustrates an example method for interacting with the in-vehicle vending apparatus when there is only one user associated with a ride. In particular embodiment, the one user may be associated with one passenger or, alternatively, multiple passengers (e.g., a parent and child may be associated with the parent's user account, two friends may be associated with one of the friend's user account, etc.). In this situation, as shown in FIG. 9, the relevant entities to this transaction include the provider's computing device 350 (associated with the provider 340), the requestor's computing device 320 (associated with the requestor 310), the transportation management system 330, and the in-vehicle vending apparatus 530. The method may begin at step 910, where the provider's computing device 350 may send a confirmation of starting the ride to the transportation management system 330. At step 920, the requestor's computing device 320 may send a request for one or more items from the in-vehicle vending apparatus 530 to the transportation management system 330. In particular embodiments, step 920 may comprise the requestor's computing device 320 sending a request for access to the in-vehicle vending apparatus 530. Alternatively, step 920 may comprise the user first requesting one or more items using the transportation application (e.g., mobile application 700) running on the requestor computing device 320 via the user interface 710 to review and select one or more items the user would like to take from the in-vehicle vending apparatus 530. In addition, in particular embodiments, the request may include user information and/or identity information to identify and/or authenticate the user and connect the user to an associated user account. After the transportation management system 330 receives the request, at step 930, the transportation management system 330 may first determine that the user is the only user associated with the ride. In particular embodiments, step 930 may also include the transportation management system 330 retrieving the user account associated with the user.

At step 940, the requestor computing device 320 may request access to the in-vehicle vending apparatus 530. Then, at step 950, the user may start the vending session using the in-vehicle vending apparatus 530 to access the items in one or more ways. As an example, the user may directly manipulate the latch 610 on the in-vehicle vending apparatus 530 to open it and take one or more items. As another example, the user may be required to enter a code on the display area 606 to open the box, and the code may be sent to the user from the transportation management system 330 to the requestor computing device 320 (e.g., the access code discussed below). The code may be one or more numbers, letters, alphanumeric, or any other suitable code. As yet another example, the user may be required to interact with interactive buttons 608 on display area 606 to open the in-vehicle vending apparatus 530, and the interactive buttons 608 may include a picture of the user for user-friendliness. As yet another example, the user may be required to tap or touch his/her requestor computing device 320 to the in-vehicle vending apparatus 530 to open the device 320 so that the requestor computing device 320 may wirelessly communicate with the device 320 (e.g., via NFC, Bluetooth, etc.) to confirm the opening of the device 320. The requestor computing device may pass an identifier or passcode to the in-vehicle vending apparatus over the wireless communication that allows the in-vehicle vending apparatus to identify the user and/or to report the identity of the user to the transportation management system. Alternatively, in particular embodiments, after the transportation management system 330 determines that the user is the only user associated with the ride, it may then send an access code to unlock or simply to allow access to the in-vehicle vending apparatus 530 prior to the user starting the vending session.

In particular embodiments, the in-vehicle vending apparatus 530 may be initially locked, or alternatively, unlocked at the start of the vending session. In particular embodiments, at the start of the vending session, the transportation management system 330 may send an access code to the in-vehicle vending apparatus 530 to, for example, unlock the in-vehicle vending apparatus 530. Alternatively, the transportation management system 330 may send an access code to the requestor computing device 320 for the user to enter and/or input into the in-vehicle vending apparatus 530 to gain access to the items in the in-vehicle vending apparatus 530. In this situation, the in-vehicle vending apparatus 530 may have a set default code to confirm that the user's access code is correct, a continuously updated default code (e.g., updated in a consistent way such as incrementing by a certain time interval and/or amount per transaction) to confirm that the user's access code is correct, a code received from the transportation management system 330 used to confirm that the user's access code is correct, or any combination thereof. For example, the access code may be delivered to both the user computing device and the in-vehicle vending apparatus from the transaction management system. The user may enter the access code into an input area on the in-vehicle vending apparatus and the in-vehicle vending apparatus may validate the input by the user to ensure it matches the passcode. If it matches, the in-vehicle vending apparatus may unlock and start a vending session. If the user input does not match, the in-vehicle vending apparatus may remain locked and may display an error code and report the incorrect input to the user and/or transportation management system.

After the user opens the in-vehicle vending apparatus 530 and starts the vending session, the user may remove one or more items, and then close the vending apparatus 530. At this point, at step 960, the in-vehicle vending apparatus 530 may determine that the user has accessed the vending apparatus 530 during the vending session, and has completed this vending session. At step 970, the vending session may end and the vending apparatus 530 may send to the transportation management system 330 information on whether any items were taken during the vending session. If any items were taken by the user, information on the number and identity of these items would be sent as well. Then, at step 980, the transportation management system 330 will use the information received to update inventory information associated with the in-vehicle vending apparatus 530, for example, via the inventory management services 409. In particular embodiments, follow-up steps may include the transportation management system 330 sending the user an itemized receipt including the items and any cost of the items that the user took. As an example, this itemized receipt may be incorporated into a receipt sent to the user including all costs associated with the entire ride.

Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for interacting with the in-vehicle vending apparatus when there is only one user associated with a ride including the particular steps of the method of FIG. 9, this disclosure contemplates any suitable method for interacting with the in-vehicle vending apparatus when there is only one user associated with a ride including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

In particular embodiments, more than one user may be present during a ride, which may result in the problem of determining which user (or users) will be billed for the items taken during the ride. As discussed above, in particular embodiment, each of the users may be associated with one passenger or, alternatively, multiple passengers. FIG. 10 illustrates an example method for interacting with the in-vehicle vending apparatus when there are multiple users associated with a ride. In this situation, as shown in FIG. 10, the relevant entities to this transaction again include the provider's computing device 350 (associated with the provider 340), the requestor's computing device 320 (associated with the requestor 310), the transportation management system 330, and the in-vehicle vending apparatus 530. The method may begin at step 1010, where the provider's computing device 350 may send a confirmation of starting the ride to the transportation management system 330. At step 1020, the requestor's computing device 320 may send a request for one or more items from the in-vehicle vending apparatus 530 to the transportation management system 330. In particular embodiments, similar to the method described in FIG. 9, step 1020 may comprise the requestor's computing device 320 sending a request for access to the in-vehicle vending apparatus 530. Alternatively, step 1020 may comprise the user first requesting one or more items using the transportation application (e.g., mobile application 700) running on the requestor computing device 320 via the user interface 710 to review and select one or more items the user would like to take from the in-vehicle vending apparatus 530. In addition, in particular embodiments, the request may include user information and/or identity information to identify and/or authenticate the user and connect the user to an associated user account.

After the transportation management system 330 receives the request, at step 1030, the transportation management system 330 may determine that the user is one of a plurality of users associated with the ride. In particular embodiments, the transportation management system 330 may authenticate the identities of all users associated with the ride and retrieving a user account associated with each of the users. At step 1040, the transportation management system 330 may send an access code to the user requesting the items. Then, at step 1050, the user may use the received access code and request access to the in-vehicle vending apparatus 530 using the access code. Then, at step 1060, the user may start the vending session using the in-vehicle vending apparatus 530 to access the items inside the in-vehicle vending apparatus 530 in one or many ways. As an example, the transportation management system 330 may request the user to perform an action to verify and confirm that he/she will be the user that will be making the purchase of items. As an example, the user may be required to enter a code on the display area 606 to open the box, and the code may be sent to the user from the transportation management system 330 to the requestor computing device 320 (e.g., the access code discussed above). The code may be one or more numbers, letters, alphanumeric, or any other suitable code. As another example, the user may be required to interact with one of a plurality of interactive buttons 608 on display area 606 to open the in-vehicle vending apparatus 530, and the interactive buttons 608 may include pictures of all the users. As yet another example, the user may be required to tap or touch his/her requestor computing device 320 to the in-vehicle vending apparatus 530 to open the device 320 so that the requestor computing device 320 may wirelessly communicate with the device 320 (e.g., via NFC, Bluetooth, etc.) to confirm his/her identity.

After the user opens the in-vehicle vending apparatus 530, the user may remove one or more items, and then close the vending apparatus 530. At this point, at step 1070, the in-vehicle vending apparatus 530 may determine that the user has accessed the vending apparatus 530 during the vending session, and has completed this vending session. Then, similar to the method described in FIG. 9, at step 1080, the vending session may end and the vending apparatus 530 may send to the transportation management system 330 information on whether any items were taken during the vending session. If any items were taken by the user, information on the number and identity of these items would be sent as well. At step 1090, the transportation management system 330 will use the information received to update inventory information associated with the in-vehicle vending apparatus 530, for example, via the inventory management services 409. As described above, follow-up steps may include the transportation management system 330 sending the user an itemized receipt including the items and any cost of the items that the user took. As an example, this itemized receipt may be incorporated into a receipt sent to the user including all costs associated with the entire ride.

Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates an example method for interacting with the in-vehicle vending apparatus when there are multiple users associated with a ride including the particular steps of the method of FIG. 10, this disclosure contemplates any suitable method for interacting with the in-vehicle vending apparatus when there are multiple users associated with a ride including any suitable steps, which may include all, some, or none of the steps of the method of FIG. 10, where appropriate. Furthermore, although this disclosure describes and illustrates particular components, devices, or systems carrying out particular steps of the method of FIG. 10, this disclosure contemplates any suitable combination of any suitable components, devices, or systems carrying out any suitable steps of the method of FIG. 10.

In particular embodiments, the situation may arise where no users are linked to a ride associated with the in-vehicle vending apparatus 530. As an example, one or more users may be using a ride service that is different from the ride service associated with the in-vehicle vending apparatus 530. However, one or more of the users may nonetheless want to purchase items from the in-vehicle vending apparatus 530. As an example, the one or more users may see the in-vehicle vending apparatus 530 while using the ride service not associated with the in-vehicle vending apparatus 530, and ask the ride provider 340 about how to purchase items. In this situation, the user may be associated with a particular in-vehicle vending apparatus (e.g., vending apparatus 530) instead of simply being associated with the ride. In particular embodiments, the ride provider 340 may ask the users to activate the transportation application running on a requestor computing device 320 of the users in order to interact with the in-vehicle vending apparatus 530. In particular embodiments, the ride provider 340 may also be required to activate a transportation application on their provider computing device 350 as well to facilitate the transaction and send relevant data to the transportation management system 330 during the transaction.

FIG. 11 illustrates an example method for interacting with the in-vehicle vending apparatus when there are no users associated with a ride. The method may start at step 1110, where the user may first activate the transportation application running on the requestor's computing device 320 associated with the in-vehicle vending apparatus 530. In particular embodiments, the ride provider may also be required to activate the transportation application running on the provider's computing device 350. Then, at step 1120, the requestor's computing device 320 may send a request for one or more items from the in-vehicle vending apparatus 530 to the transportation management system 330 via the transportation application running on the requestor computing device 320. Similar to the methods of FIGS. 9 and 10, in particular embodiments, step 1120 may comprise the requestor's computing device 320 sending a request for access to the in-vehicle vending apparatus 530. Alternatively, step 1120 may comprise the user first requesting one or more items using the transportation application (e.g., mobile application 700) running on the requestor computing device 320 via the user interface 710 to review and select one or more items the user would like to take from the in-vehicle vending apparatus 530. In addition, in particular embodiments, the request may include user information and/or identity information to identify and/or authenticate the user and connect the user to an associated user account. After the transportation management system 330 receives the request, at step 1130, the transportation management system 330 may determine that the user is associated with the in-vehicle vending apparatus 530 and, additionally, may retrieve a user account associated with the user. Then, at step 1140, the requestor computing device 320 may request access to the in-vehicle vending apparatus 530. Then, at step 1150, the user may start the vending session using the in-vehicle vending apparatus 530 to access the items in one or more ways (e.g., similar to those methods described above in relation to step 950 of FIG. 9). In particular embodiments, the user may receive an access code from the transportation management system 330 that the user may then use to access the in-vehicle vending apparatus 530, as discussed above.

After the user opens the in-vehicle vending apparatus 530 and starts the vending session, the user may remove one or more items, and then close the vending apparatus 530. At this point, at step 1160, the in-vehicle vending apparatus 530 may determine that the user has accessed the vending apparatus 530 during the vending session, and has completed this vending session. At step 1170, the vending session may end and the vending apparatus 530 may send to the transportation management system 330 information on whether any items were taken during the vending session. If any items were taken by the user, information on the number and identity of these items would be sent as well. Then, at step 1180, the transportation management system 330 will use the information received to update inventory information associated with the in-vehicle vending apparatus 530, for example, via the inventory management services 409. As discussed above, in particular embodiments, follow-up steps may include the transportation management system 330 sending the user an itemized receipt including the items and any cost of the items that the user took.

Although this disclosure describes and illustrates particular steps of the method of FIG. 11 as occurring in a particular order, this disclosure contemplates any suitable steps of the method of FIG. 11 occurring in any suitable order. Moreover, although this disclosure describes and illustrates an example method for interacting with the in-vehicle vending apparatus when there are no users associated with a ride including the particular steps of the method of FIG. 11, this disclosure contemplates any suitable method for interacting with the in-vehicle vending apparatus when there are no users associated with a ride including any suitable steps, which may include all, some, or none of the steps of the method of FIG. 11, where appropriate. Furthermore, although this disclosure describes and illustrates particular components, devices, or systems carrying out particular steps of the method of FIG. 11, this disclosure contemplates any suitable combination of any suitable components, devices, or systems carrying out any suitable steps of the method of FIG. 11.

In particular embodiments, the provider communication device 520 may be used during the transaction to display relevant information to the users. As an example, the provider communication device 520 may be used to display information on the items that are available free of charge and for purchase to the users during a ride, along with relevant price details. As another example, the provider communication device 520 may provide confirmation information associated with a transaction and a listing of items taken during a session. This information may be helpful in notifying and encouraging other users to engage with and purchase items from the in-vehicle vending apparatus 530.

In particular embodiments, the in-vehicle vending apparatus 530 may communicate with the inventory management services 409 of the transportation management system 402 to manage the inventory of items in an automated and unobtrusive way. In addition, as discussed below, the management of the inventory of items may involve the use of the mobile application 700 on the ride requestor's (i.e., user's) computing device 320, in addition to one or more sensors 620, such as a camera, weight/load sensor, infrared sensor, radio-frequency (RF) sensor, gyroscope, accelerometer, and any other suitable sensor within the user compartment of the vehicle. As an example, the sensors 620 may be used to determine and/or confirm the identity of the one or more items that are taken from the in-vehicle vending apparatus 530 during a vending session. As discussed with regard to FIGS. 9-11, the methods for using the in-vehicle vending apparatus 530 may include initiating a vending session by sending an access code to an in-vehicle vending apparatus to provide the user (or users) access to one or more items, and after each user completes a vending session and the vending session is determined to have ended, then identifying one or more items taken from the vending apparatus 530 during the vending session based on sensor data from the vending apparatus 530, and then sending a confirmation of the one or more items taken to each of the users that purchased one or more items.

In particular embodiments, the tracking of items bought and/or taken from the in-vehicle vending apparatus 530 may be conducted in one or more different ways, and the information may be uploaded to the inventory management services 409 of the transportation management system 402 for further management and processing (e.g., for updating an inventory list). As an example, the tracking of items may be accomplished by collecting information from the mobile application 700 used by the ride request 310 on the requestor computing device 320 during his/her ride. As an example, the mobile application 700 may include a list of all items available in the in-vehicle vending apparatus 530. The mobile application 700 may have received this list of items after the completion of the last vending session. In a current vending session, the user may interact with the user interface 710 of the mobile application 700 to select certain items that are either free of charge or available for purchase, and make a final selection of items using the user interface 710, as described in relation to FIG. 7. After the user makes his/her final selection of items, the mobile application 700 may send the list of items to be taken from the in-vehicle vending apparatus 530 to the inventory management services 409 so that it may update the inventory list associated with the in-vehicle vending apparatus 530.

Figure 12:
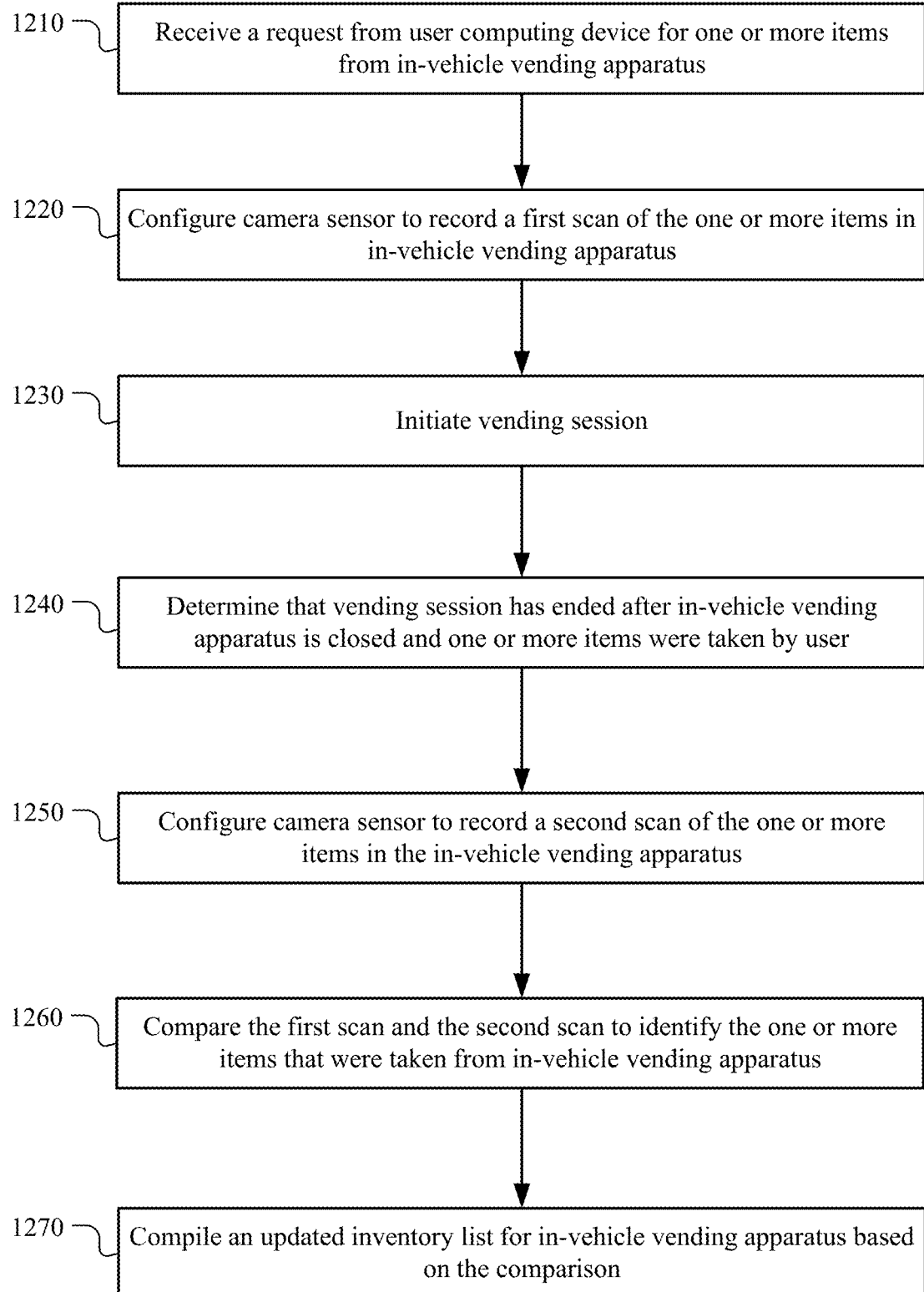
FIG. 12 illustrates an example method for using comparison scanning to identify one or more items taken during a vending session.
Figure 13:
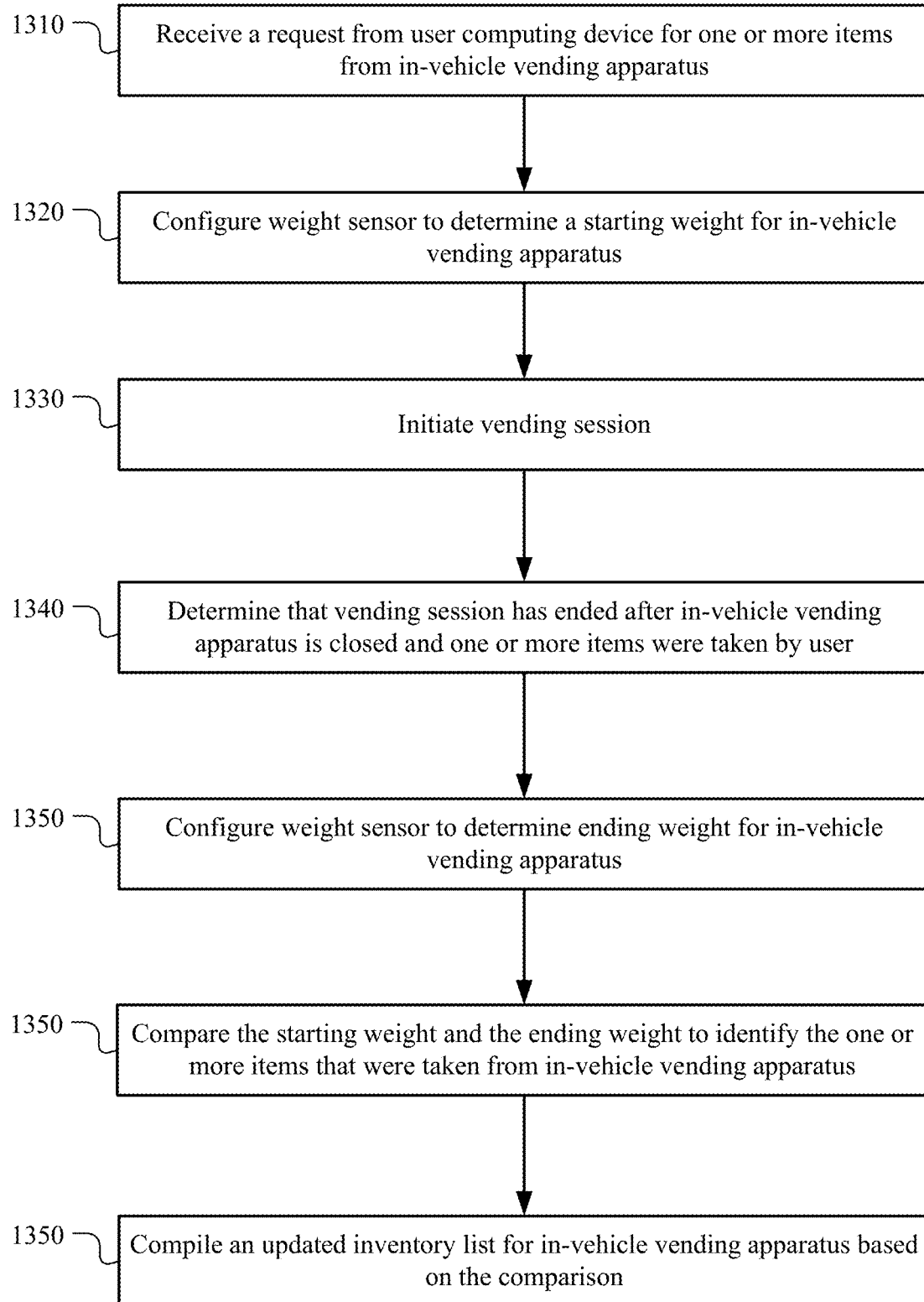
FIG. 13 illustrates an example method for using a weight-based scanning to identify one or more items taken during a vending session.
Figure 14:
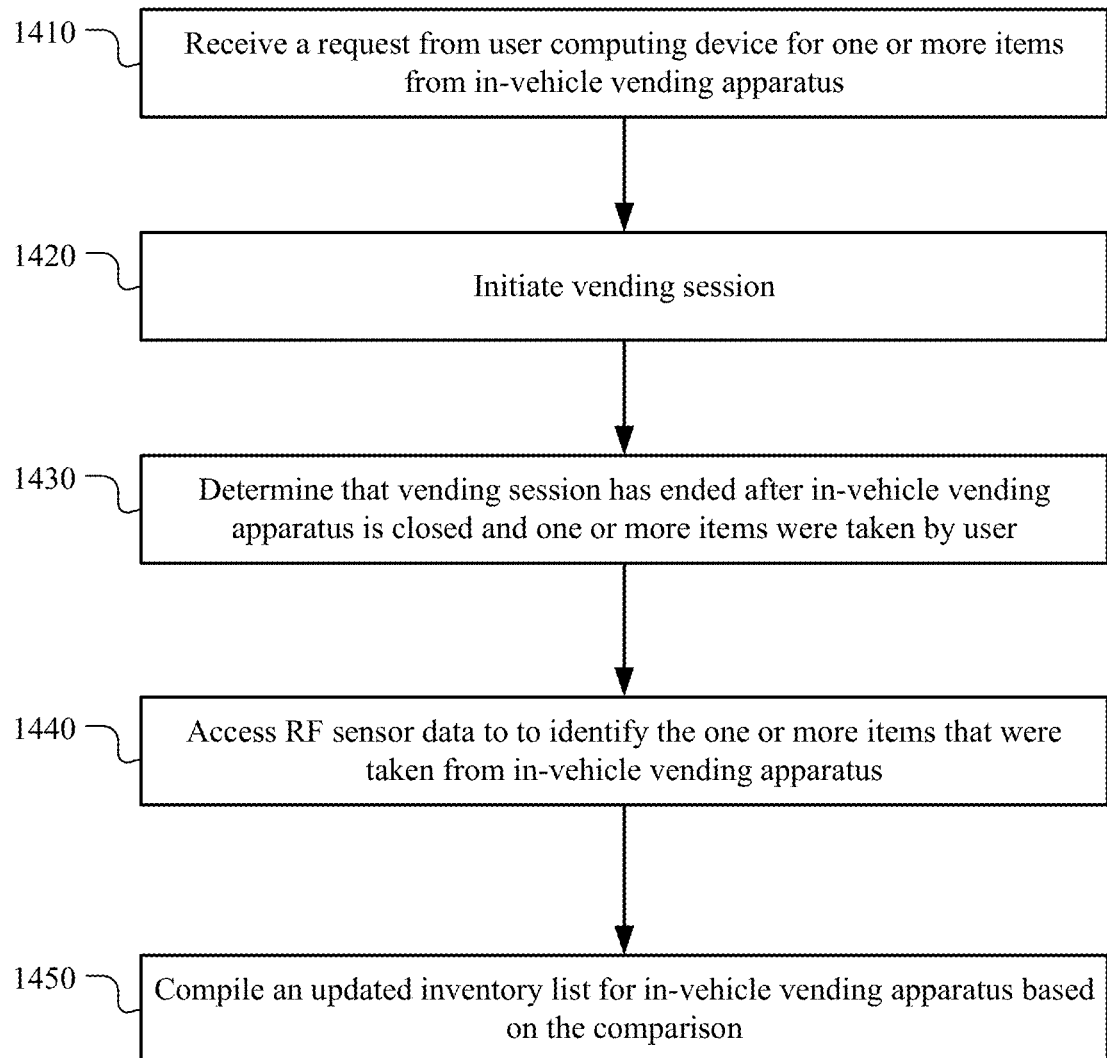
FIG. 14 illustrates an example method for using wireless-chip identification to identify one or more items taken during a vending session.

In particular embodiments, even if the mobile application 700 sends a list of items selected and/or purchased by the user, the transportation management system 402 may want to independently confirm that the list of items selected and taken from the in-vehicle vending apparatus 530 is accurate. Alternatively, the user may directly take items from the in-vehicle vending apparatus 530 without using the mobile application 700 to select the items taken before the vending session, and thus the transportation management system 402 may need to independently determine the list of items selected and taken from the in-vehicle vending apparatus 530. In particular embodiments, the transportation management system 402 may determine this list of items based on sensor data collected from the in-vehicle vending apparatus 530. FIGS. 12-14 illustrate example methods for collecting sensor-based data to identify the one or more items taken from the in-vehicle vending apparatus 530.

FIG. 12 illustrates an example method for using comparison scanning to identify one or more items taken during a vending session. As shown in FIG. 6B, the sensor 620 may be a camera located on the inside of the top surface 602, and may scan and capture the items in the in-vehicle vending apparatus 530. The method may start at step 1210, where the user may send a request for one or more items to the transportation management system 330 (e.g., via the mobile application 700, or by trying to directly access the in-vehicle vending apparatus 530). Then, at step 1220, the transportation management system 330 may configure the sensor 620 (e.g., the camera) to record a first scan of the one or more items in the in-vehicle vending apparatus 530 prior to sending the access code to initiate the vending session. The first scan may comprise a "before" picture of the inside contents of the in-vehicle vending apparatus 530, wherein the one or more items are placed in a way to distinguish each of the items from another (e.g., whether they are stacked next to each other or one on top of another). After taking the first scan, at step 1230, the user may use an access code to activate/start the vending session (as discussed above in relation to FIGS. 9-11). Alternatively, the transportation management system 330 may send the access code to initiate the vending session. At step 1240, the transportation management system 330 may determine that the vending session has ended after the in-vehicle vending apparatus 530 is closed and one or more items were taken by the user. At step 1250, the transportation management system 330 may configure the sensor 620 (e.g., the camera) to record a second scan of the one or more items in the in-vehicle vending apparatus 530 following the end of the vending session. The second scan may comprise an "after" picture of the inside contents of the in-vehicle vending apparatus 530. Then, at step 1260, the transportation management system 330 may compare the first scan and the second scan to determine the difference between them in order to identify the one or more items that were taken from the in-vehicle vending apparatus 530. Finally, at step 1270, the transportation management system 330 may compile an updated inventory list for the in-vehicle vending apparatus 530 based on the comparison. As an example, the updated inventory list may be downloaded and stored by the in-vehicle vending apparatus 530 in sensor data 636.

Although this disclosure describes and illustrates particular steps of the method of FIG. 12 as occurring in a particular order, this disclosure contemplates any suitable steps of the method of FIG. 12 occurring in any suitable order. Moreover, although this disclosure describes and illustrates an example method for using comparison scanning to determine one or more items taken during a vending session including the particular steps of the method of FIG. 12, this disclosure contemplates any suitable method for using comparison scanning to determine one or more items taken during a vending session including any suitable steps, which may include all, some, or none of the steps of the method of FIG. 12, where appropriate. Furthermore, although this disclosure describes and illustrates particular components, devices, or systems carrying out particular steps of the method of FIG. 12, this disclosure contemplates any suitable combination of any suitable components, devices, or systems carrying out any suitable steps of the method of FIG. 12.

FIG. 13 illustrates an example method for using a weight-based scanning to identify one or more items taken during a vending session. As shown in FIG. 6B, the sensor 620 may be a weight/load sensor located at the bottom surface 604 of the in-vehicle vending apparatus 530 for detecting any weight changes within the vending apparatus 530. The method may start at step 1310, where the user may send a request for one or more items to the transportation management system 330 (e.g., via the mobile application 700, or by trying to directly access the in-vehicle vending apparatus 530). Then, at step 1320, the transportation management system 330 may configure the sensor 620 (e.g., the one or more weight sensors) to collect a starting weight, which may be determined based on a cumulative sum of weights associated with each of one or more items in the in-vehicle vending apparatus 530 prior to sending the access code. As an example, a weight of each of the items may be known, and thus the cumulative sum of weights may be used to determine the contents of the in-vehicle vending apparatus 530. As another example, multiple sensors 620 may be distributed on the bottom surface 604 of the in-vehicle vending apparatus 530, such as being distributed under each stack of the same type of item. After taking the starting weight, at step 1330, the user may use an access code to activate/start the vending session (as discussed above in relation to FIGS. 9-11). Alternatively, the transportation management system 330 may send the access code to initiate the vending session. At step 1340, the transportation management system 330 may determine that the vending session has ended after the in-vehicle vending apparatus 530 is closed and one or more items were taken by the user. At step 1350, the transportation management system 330 may configure the sensor 620 (e.g., the weight sensors) to collect an ending weight, which may be determined based on a cumulative sum of weights associated with each of the one or more items in the in-vehicle vending apparatus 530 after the vending session has ended. Then, at step 1360, the transportation management system 330 may compare the starting weight with the ending weight to determine the difference between them in order to identify the one or more items that were taken from the in-vehicle vending apparatus 530. Finally, at step 1370, the transportation management system 330 may compile an updated inventory list for the in-vehicle vending apparatus 530 based on the comparison. As discussed above, the updated inventory list may be downloaded and stored by the in-vehicle vending apparatus 530 in sensor data 636.

Although this disclosure describes and illustrates particular steps of the method of FIG. 13 as occurring in a particular order, this disclosure contemplates any suitable steps of the method of FIG. 13 occurring in any suitable order. Moreover, although this disclosure describes and illustrates an example method for using a weight-based scanning to determine one or more items taken during a vending session including the particular steps of the method of FIG. 13, this disclosure contemplates any suitable method for using a weight-based scanning to determine one or more items taken during a vending session including any suitable steps, which may include all, some, or none of the steps of the method of FIG. 13, where appropriate. Furthermore, although this disclosure describes and illustrates particular components, devices, or systems carrying out particular steps of the method of FIG. 13, this disclosure contemplates any suitable combination of any suitable components, devices, or systems carrying out any suitable steps of the method of FIG. 13.

FIG. 14 illustrates an example method for using wireless-chip identification to identify one or more items taken during a vending session. As shown in FIG. 6B, the sensor 620 may be a RF sensor, e.g., for reading RFID or other relevant identification tags on items for determining which items were taken during a vending session. In particular embodiments, the one or more items may each include a simple RFID chip or identification tag for tracking purposes. The method may start at step 1410, where the user may send a request for one or more items to the transportation management system 330 (e.g., via the mobile application 700, or by trying to directly access the in-vehicle vending apparatus 530). Then, at step 1420, the user may use an access code to activate/start the vending session (as discussed above in relation to FIGS. 9-11). Alternatively, the transportation management system 330 may send the access code to initiate the vending session. At step 1430, the transportation management system 330 may determine that the vending session has ended after the in-vehicle vending apparatus 530 is closed and one or more items were taken by the user (e.g., as determined based on the RF sensor scanning and detecting the removal of one or more RFIDs or other identification tags). At step 1440, the transportation management system 330 may access the RF sensor data to determine the identity and amount of items taken from the in-vehicle vending apparatus 530 during the vending session. Finally, at step 1450, the transportation management system 330 may compile an updated inventory list for the in-vehicle vending apparatus 530 based on the items identified as taken during the vending session. As discussed above, the updated inventory list may be downloaded and stored by the in-vehicle vending apparatus 530 in sensor data 636.

Although this disclosure describes and illustrates particular steps of the method of FIG. 14 as occurring in a particular order, this disclosure contemplates any suitable steps of the method of FIG. 14 occurring in any suitable order. Moreover, although this disclosure describes and illustrates an example method for using wireless-chip identification to determine one or more items taken during a vending session including the particular steps of the method of FIG. 14, this disclosure contemplates any suitable method for using wireless-chip identification to determine one or more items taken during a vending session including any suitable steps, which may include all, some, or none of the steps of the method of FIG. 14, where appropriate. Furthermore, although this disclosure describes and illustrates particular components, devices, or systems carrying out particular steps of the method of FIG. 14, this disclosure contemplates any suitable combination of any suitable components, devices, or systems carrying out any suitable steps of the method of FIG. 14.

In particular embodiments, the inventory management services 409 may collaborate with the ride services module 408 to generate user-specific and region-specific inventory needs and intelligence using rule-based algorithms or machine-learning models to enhance user experience during a ride. As an example, the transportation management system 330 may track and collect data on items and categories of items that are well received by each of one or more users of the ride service, or by factors such as geographic region, gender, age group, ethnicity, income range, urban context, points-of-interest, season, any other relevant factors, or any combination thereof. This data may be inputted into machine-learning models in order to provide better inventory suggestions for the ride providers 340 in order to maximize user experience and satisfaction. In addition, because space is limited in the in-vehicle vending apparatus 530, better inventory suggestions may also help ensure that items are consistently purchased or taken by users so that no item remains for longer periods of time due to lack of interest.

As an example, based on user demand, the inventory management services 409 may determine that gum is a very popular item for Region A, but a very unpopular item for Region B. Based on this determination, the inventory management services 409 may suggest to all the ride providers 340 of Region A to maintain a steady supply of gum, in addition to providing various flavors of gum, in their in-vehicle vending apparatus 530, but suggest to all the ride providers 340 of Region B to not supply any more gum and instead use that space for something else (e.g., a candy item). As another example, based on user demand, the inventory management services 409 may determine that energy drinks are a very popular item for Region C (e.g., because there is a large concentration of sports bars in Region C), while energy bars are a very popular item for Region D (e.g., because there is a major international airport located in Region D). Based on this determination, the inventory management services 409 may suggest to all the ride providers 340 of Region C to maintain a steady supply of energy drinks in their in-vehicle vending apparatus 530, and suggest to all the ride providers 340 of Region C to maintain a steady supply of energy bars in their in-vehicle vending apparatus 530.

In addition, in particular embodiments, the inventory management services 409 may collaborate with the ride services module 408 to more efficiently dispatch additional inventory based on the above-discussed tracking, collecting, and analyzing of data on items and categories of items that are well received by each of one or more users of the ride service, or by factors such as geographic region, gender, age group, ethnicity, income range, urban context, points-of-interest, season, any other relevant factors, or any combination thereof. As an example, the inventory management services 409 may automatically send the ride providers 340 reminders to add additional items when inventory is determined to be low, and can also include suggestions for which items to re-stock, as discussed above. As another example, for further convenience, there may be one or more inventory hub locations with items for restocking the in-vehicle vending apparatus 530 that the inventory management services 409 may direct the ride providers 340 to when their inventory is low. This may be done by sending a request to the ride providers 340, similar to a request from a ride requestor 310, to proceed to a designated location. In the case of an autonomous vehicle (e.g., a vehicle with no human driver), the inventory management services 409 may automatically direct the autonomous vehicle to the inventory hub location when inventory is determined to be low.

In particular embodiments, the inventory management services 409 may collaborate with the ride services module 408 to generate attribute-based dispatch of vehicles based on inventory intelligence and algorithms and machine learning models (discussed above) to intelligently suggest vehicles with particular items to the ride requestors 310. These suggestions may be based on item-specific vehicles, destination-specific vehicles, service-specific vehicles, vehicles with premium add-ons, other relevant parameters, and/or a set of weight parameters including these parameters, as discussed in more detail below.

The transportation management system 330 may track and collect data on items and categories of items that are well received by each of one or more users of the ride service, or by factors such as geographic region, gender, age group, ethnicity, income range, urban context, points-of-interest, season, any other relevant factors, or any combination thereof, as discussed above. This data may be inputted into machine-learning models so that the inventory management services 409 may include any the requestor's preferences or needs with regard to the items available free of charge or for purchase in an in-vehicle vending apparatus 530 associated with each of the ride providers 340. As discussed above, the transportation management system 330 may locate candidate ride providers 340 who are available (e.g., based on a status indicator provided through each ride provider's 340 computing device 350) and in the general vicinity of the requested pick-up location (e.g., based on GPS data provided by the provider computing device 350 and the requestor computing device 320). In particular embodiments, the transportation management system's 330 decision of which candidate ride providers 340 to recommend to the ride requestor 310 may be based on the ride requestor's 310 user-specified or purchase-information-determined preferences for one or more items. As an example, if a ride requestor 310 has previously purchased a lot of gum, and/or has indicated a strong preference for gum, then the transportation management system 330 would preferentially locate candidate ride providers 340 who are available, in the general vicinity of the requested pick-up location, and also have a good stock of gum in their in-vehicle vending apparatus 530 to recommend to the ride requestor 310.

In particular embodiments, the transportation management system's 330 decision of which candidate ride providers 340 to recommend to the ride requestor 310 may be based on the ride requestor's 310 specified destination, which may be associated with particular items based on the above-discussed collecting and analyzing of data on items and categories of items that are well received by each of one or more users of the ride service. As an example, if a high percentage of users who travel to the airport purchase an energy bar, and the ride requestor 310 has indicated his/her destination to be the airport, then the transportation management system 330 would preferentially locate candidate ride providers 340 who are available, in the general vicinity of the requested pick-up location, and also have a good stock of energy bars in their in-vehicle vending apparatus 530 to recommend to the ride requestor 310.

In particular embodiments, the transportation management system's 330 decision of which candidate ride providers 340 to recommend to the ride requestor 310 may be based on the ride requestor's 310 request for a specific service. As an example, if the ride requestor 310 requests special services that require additional stops during the ride (e.g., for coffee or food), then the transportation management system 330 would preferentially locate candidate ride providers 340 who are available, in the general vicinity of the requested pick-up location and in the general vicinity of locations that offer the special services (e.g., a coffee shop, a sandwich shop), and also are willing to make additional stops during the ride to recommend to the ride requestor 310.

In particular embodiment, the transportation management system's 330 decision of which candidate ride providers 340 to recommend to the ride requestor 310 may be based on the ride requestor's 310 request for premium add-on services. As an example, if the ride requestor 310 requests a premium add-on service that require additional before during the ride (e.g., for dry cleaning or grocery shopping), then the transportation management system 330 would preferentially locate candidate ride providers 340 who are available, in the general vicinity of the requested pick-up location and in the general vicinity of locations that offer the premium services requested (e.g., a dry cleaning store, a grocery store), and also are willing to make additional stops before the ride to recommend to the ride requestor 310.

Moreover, the mobile application 700 that the ride requestor 310 uses to request a ride may include one or more UI aspects to visually indicate to the ride requestor 310 that certain vehicles include certain items for purchase. In particular embodiments, the user interface 710 may include one or more badges associated with each of the candidate ride providers 340 to indicate that they provide certain items and/or services. These candidate ride providers 340 may be suggested based on the ride requestor's 310 user-specified or purchase-information-determined preferences for one or more items, as discussed above. Alternatively, these candidate ride providers 340 may be suggested based on advertisement and/or promotional reasons. As an example, if a ride requestor 310 has previously purchased a lot of candy, and/or has indicated a strong preference for candy, then the user interface 710 of the mobile application 700 may display one or more candidate ride providers 340 (e.g., as a moving vehicle on a map) with a badge or visual marker indicating that they provide candy as an item in their in-vehicle vending apparatuses 530. As another example, if a third-party is looking to promote a new kind of energy drink, and a ride requestor 310 has previously purchased a lot of energy drinks, and/or has indicated a strong preference for energy drinks, then the user interface 710 of the mobile application 700 may display one or more candidate ride providers 340 with a badge or visual marker indicating that they are providing a new energy drink as part of a limited-time promotion as an item in their in-vehicle vending apparatuses 530.

Figure 15:
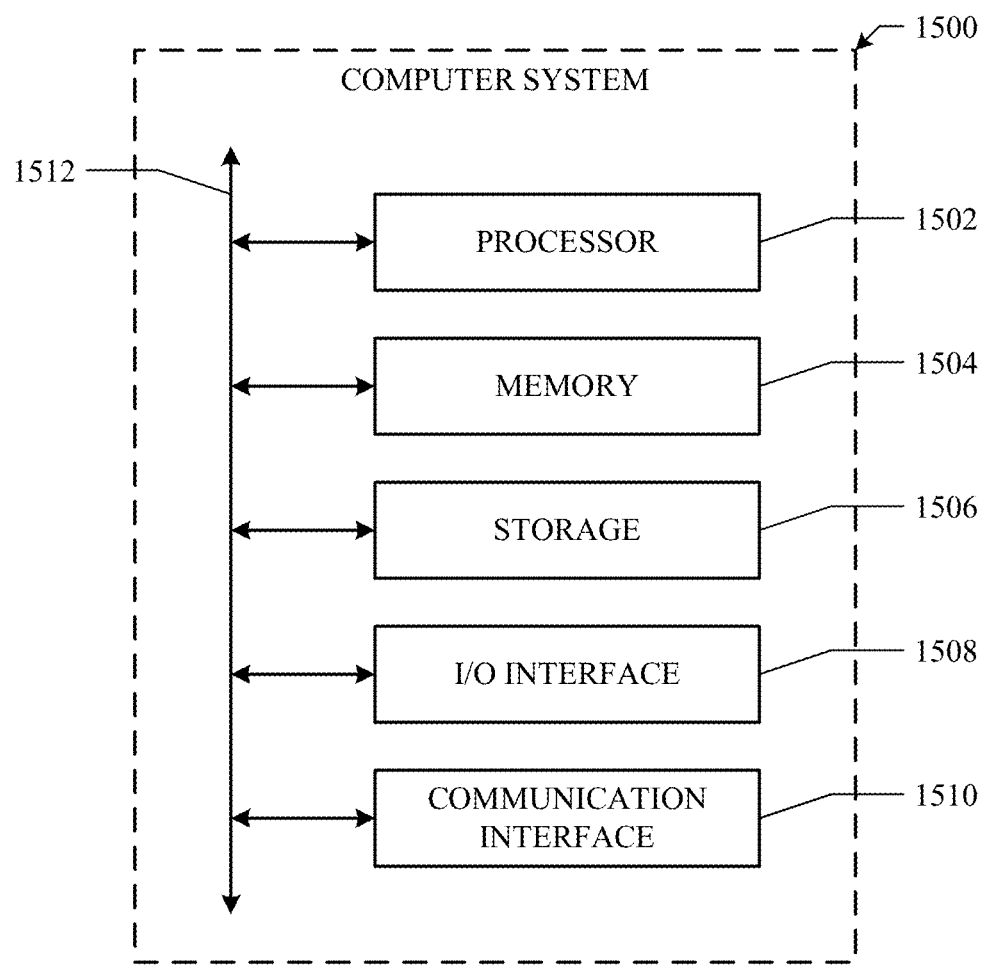
FIG. 15 illustrates an example of a computing system.

FIG. 15 illustrates an example computer system 1500. In particular embodiments, one or more computer systems 1500 perform one or more steps of one or more methods described or illustrated herein. In particular embodiments, one or more computer systems 1500 provide the functionalities described or illustrated herein. In particular embodiments, software running on one or more computer systems 1500 performs one or more steps of one or more methods described or illustrated herein or provides the functionalities described or illustrated herein. Particular embodiments include one or more portions of one or more computer systems 1500. Herein, a reference to a computer system may encompass a computing device, and vice versa, where appropriate. Moreover, a reference to a computer system may encompass one or more computer systems, where appropriate.

This disclosure contemplates any suitable number of computer systems 1500. This disclosure contemplates computer system 1500 taking any suitable physical form. As example and not by way of limitation, computer system 1500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1500 may include one or more computer systems 1500; be unitary or distributed; span multiple locations; span multiple machines; span multiple data centers; or reside in a cloud, which may include one or more cloud components in one or more networks. Where appropriate, one or more computer systems 1500 may perform without substantial spatial or temporal limitation one or more steps of one or more methods described or illustrated herein. As an example and not by way of limitation, one or more computer systems 1500 may perform in real time or in batch mode one or more steps of one or more methods described or illustrated herein. One or more computer systems 1500 may perform at different times or at different locations one or more steps of one or more methods described or illustrated herein, where appropriate.

In particular embodiments, computer system 1500 includes a processor 1502, memory 1504, storage 1506, an input/output (I/O) interface 1508, a communication interface 1510, and a bus 1512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1502 includes hardware for executing instructions, such as those making up a computer program. As an example and not by way of limitation, to execute instructions, processor 1502 may retrieve (or fetch) the instructions from an internal register, an internal cache, memory 1504, or storage 1506; decode and execute them; and then write one or more results to an internal register, an internal cache, memory 1504, or storage 1506. In particular embodiments, processor 1502 may include one or more internal caches for data, instructions, or addresses. This disclosure contemplates processor 1502 including any suitable number of any suitable internal caches, where appropriate. As an example and not by way of limitation, processor 1502 may include one or more instruction caches, one or more data caches, and one or more translation lookaside buffers (TLBs). Instructions in the instruction caches may be copies of instructions in memory 1504 or storage 1506, and the instruction caches may speed up retrieval of those instructions by processor 1502. Data in the data caches may be copies of data in memory 1504 or storage 1506 that are to be operated on by computer instructions; the results of previous instructions executed by processor 1502 that are accessible to subsequent instructions or for writing to memory 1504 or storage 1506; or any other suitable data. The data caches may speed up read or write operations by processor 1502. The TLBs may speed up virtual-address translation for processor 1502. In particular embodiments, processor 1502 may include one or more internal registers for data, instructions, or addresses. This disclosure contemplates processor 1502 including any suitable number of any suitable internal registers, where appropriate. Where appropriate, processor 1502 may include one or more arithmetic logic units (ALUs), be a multi-core processor, or include one or more processors 1502. Although this disclosure describes and illustrates a particular processor, this disclosure contemplates any suitable processor.

In particular embodiments, memory 1504 includes main memory for storing instructions for processor 1502 to execute or data for processor 1502 to operate on. As an example and not by way of limitation, computer system 1500 may load instructions from storage 1506 or another source (such as another computer system 1500) to memory 1504. Processor 1502 may then load the instructions from memory 1504 to an internal register or internal cache. To execute the instructions, processor 1502 may retrieve the instructions from the internal register or internal cache and decode them. During or after execution of the instructions, processor 1502 may write one or more results (which may be intermediate or final results) to the internal register or internal cache. Processor 1502 may then write one or more of those results to memory 1504. In particular embodiments, processor 1502 executes only instructions in one or more internal registers or internal caches or in memory 1504 (as opposed to storage 1506 or elsewhere) and operates only on data in one or more internal registers or internal caches or in memory 1504 (as opposed to storage 1506 or elsewhere). One or more memory buses (which may each include an address bus and a data bus) may couple processor 1502 to memory 1504. Bus 1512 may include one or more memory buses, as described in further detail below. In particular embodiments, one or more memory management units (MMUs) reside between processor 1502 and memory 1504 and facilitate accesses to memory 1504 requested by processor 1502. In particular embodiments, memory 1504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1504 may include one or more memories 1504, where appropriate. Although this disclosure describes and illustrates particular memory, this disclosure contemplates any suitable memory.

In particular embodiments, storage 1506 includes mass storage for data or instructions. As an example and not by way of limitation, storage 1506 may include a hard disk drive (HDD), a floppy disk drive, flash memory, an optical disc, a magneto-optical disc, magnetic tape, or a Universal Serial Bus (USB) drive or a combination of two or more of these. Storage 1506 may include removable or non-removable (or fixed) media, where appropriate. Storage 1506 may be internal or external to computer system 1500, where appropriate. In particular embodiments, storage 1506 is non-volatile, solid-state memory. In particular embodiments, storage 1506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1506 taking any suitable physical form. Storage 1506 may include one or more storage control units facilitating communication between processor 1502 and storage 1506, where appropriate. Where appropriate, storage 1506 may include one or more storages 1506. Although this disclosure describes and illustrates particular storage, this disclosure contemplates any suitable storage.

In particular embodiments, I/O interface 1508 includes hardware, software, or both, providing one or more interfaces for communication between computer system 1500 and one or more I/O devices. Computer system 1500 may include one or more of these I/O devices, where appropriate. One or more of these I/O devices may enable communication between a person and computer system 1500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1508 for them. Where appropriate, I/O interface 1508 may include one or more device or software drivers enabling processor 1502 to drive one or more of these I/O devices. I/O interface 1508 may include one or more I/O interfaces 1508, where appropriate. Although this disclosure describes and illustrates a particular I/O interface, this disclosure contemplates any suitable I/O interface.

In particular embodiments, communication interface 1510 includes hardware, software, or both providing one or more interfaces for communication (such as, for example, packet-based communication) between computer system 1500 and one or more other computer systems 1500 or one or more networks. As an example and not by way of limitation, communication interface 1510 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 1510 for it. As an example and not by way of limitation, computer system 1500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1500 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 1500 may include any suitable communication interface 1510 for any of these networks, where appropriate. Communication interface 1510 may include one or more communication interfaces 1510, where appropriate. Although this disclosure describes and illustrates a particular communication interface, this disclosure contemplates any suitable communication interface.

In particular embodiments, bus 1512 includes hardware, software, or both coupling components of computer system 1500 to each other. As an example and not by way of limitation, bus 1512 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1512 may include one or more buses 1512, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing devices:
   receiving, from a user computing device associated with a user account, a request to initiate a ride session;
   initiating, in response to receiving the request to initiate the ride session, the ride session between the user account and a vehicle;
   determining a respective type of each of one or more items removed from an in-vehicle vending apparatus in the vehicle during the ride session; and
   associating the respective type of each of the one or more items removed from the in-vehicle vending apparatus with the user account.

2. The method of claim 1, further comprising:
   accessing an inventory list associated with the in-vehicle vending apparatus;
   updating the inventory list based on the respective type of each of the one or more items removed from the in-vehicle vending apparatus.

3. The method of claim 1, further comprising sending an itemized receipt to the user computing device, wherein the itemized receipt indicates the respective type of each of the one or more items removed from the in-vehicle vending apparatus.

4. The method of claim 1, further comprising sending an access code to the user computing device for authenticating the user account.

5. The method of claim 4, wherein the access code is sent to the user computing device via a transportation management device.

6. The method of claim 4, wherein the in-vehicle vending apparatus is unlocked subsequent to entering the access code at an interface of the in-vehicle vending apparatus.

7. The method of claim 6, further comprising sending the access code to the in-vehicle vending apparatus to verify the access code entered at the interface.

8. The method of claim 6, wherein the access code sent to the user computing device corresponds to a time-dependent code that updates based on a predetermined time interval.

9. The method of claim 6, wherein the access code sent to the user computing device corresponds to a transaction-dependent code that updates after a vending transaction.

10. The method of claim 9, wherein the transaction-dependent code is updated based on a transaction amount corresponding to the one or more items removed from the in-vehicle vending apparatus.

11. The method of claim 1, further comprising receiving a request from the user computing device to access the in-vehicle vending apparatus for the one or more items included in the in-vehicle vending apparatus.

12. A system comprising:
    one or more processors; and
    one or more computer-readable non-transitory storage media in communication with the one or more processors, the one or more computer-readable non-transitory storage media comprising instructions that when executed by the one or more processors, cause the system to perform operations comprising:
      receiving, from a user computing device associated with a user account, a request to initiate a ride session;
      initiating, in response to receiving the request to initiate the ride session, the ride session between the user account and a vehicle;
      determining a respective type of each of one or more items removed from an in-vehicle vending apparatus in the vehicle during the ride session; and
      associating the respective type of each of the one or more items removed from the in-vehicle vending apparatus with the user account.

13. The system of claim 12, wherein the operations further comprise:
    accessing an inventory list associated with the in-vehicle vending apparatus;
    updating the inventory list based on the respective type of each of the one or more items removed from the in-vehicle vending apparatus.

14. The system of claim 12, wherein the operations further comprise:
    sending an access code to the user computing device for authenticating the user account.

15. The system of claim 14, wherein the in-vehicle vending apparatus is unlocked subsequent to entering the access code at an interface of the in-vehicle vending apparatus.

16. The system of claim 15, wherein the operations further comprise:
    sending the access code to the in-vehicle vending apparatus to verify the access code entered at the interface.

17. One or more computer-readable non-transitory storage media storing instructions that, when executed by one or more processors included in one or more computing devices, cause the one or more computing devices to perform operations comprising:

receiving, from a user computing device associated with a user account, a request to initiate a ride session;

initiating, in response to receiving the request to initiate the ride session, the ride session between the user account and a vehicle;

determining a respective type of each of one or more items removed from an in-vehicle vending apparatus in the vehicle during the ride session; and associating the respective type of each of the one or more items removed from the in-vehicle vending apparatus with the user account.

18. The one or more computer-readable non-transitory storage media of claim 17, wherein the operations further comprise:

accessing an inventory list associated with the in-vehicle vending apparatus;

updating the inventory list based on the respective type of each of the one or more items removed from the in-vehicle vending apparatus.

19. The one or more computer-readable non-transitory storage media of claim 17, wherein the operations further comprise:

sending an access code to the user computing device for authenticating the user account.

20. The one or more computer-readable non-transitory storage media of claim 19, wherein the in-vehicle vending apparatus is unlocked subsequent to entering the access code an interface of the in-vehicle vending apparatus.

* * * * *